(12) United States Patent
Daisy-Cavaleri

(10) Patent No.: US 9,093,055 B2
(45) Date of Patent: Jul. 28, 2015

(54) COMPOSITION DEVICE AND METHODS OF USE

(71) Applicant: Kyran Daisy-Cavaleri, Laurelton, NY (US)

(72) Inventor: Kyran Daisy-Cavaleri, Laurelton, NY (US)

(73) Assignee: Kyran DAISY-CAVALERI, Laurelton, NY (US)

( * ) Notice: Subject to any disclaimer, the term of this patent is extended or adjusted under 35 U.S.C. 154(b) by 252 days.

(21) Appl. No.: 13/751,702

(22) Filed: Jan. 28, 2013

(65) Prior Publication Data

US 2013/0133506 A1 May 30, 2013

Related U.S. Application Data

(63) Continuation of application No. 12/847,831, filed on Jul. 30, 2010, now Pat. No. 8,378,194.

(60) Provisional application No. 61/230,437, filed on Jul. 31, 2009.

(51) Int. Cl.
*G09B 15/02* (2006.01)
*G10G 1/02* (2006.01)
*G09B 5/06* (2006.01)
*G09B 15/00* (2006.01)
*G10G 7/02* (2006.01)

(52) U.S. Cl.
CPC .. *G10G 1/02* (2013.01); *G09B 5/06* (2013.01); *G09B 15/00* (2013.01); *G10G 7/02* (2013.01)

(58) Field of Classification Search
CPC ............ H04N 21/4126; G10H 2220/015; G10H 2210/086; G10H 2240/135; G10H 2210/111; G10H 2220/101; G10H 2220/241; G10H 2220/126; G10H 2220/121; G10H 2220/091; G10H 1/18; G10H 2240/145; G10H 2210/145; G10H 1/00; G10H 1/02; G06K 9/22; G10C 3/12

See application file for complete search history.

(56) References Cited

U.S. PATENT DOCUMENTS 5,728,960 A * 3/1998 Sitrick ................. 84/477 R
6,084,168 A * 7/2000 Sitrick ................. 84/477 R (Continued)

OTHER PUBLICATIONS

Addictive Drums by Big Fish Audio and add-on—printed from <http://www.bigfishaudio.com/4DCG1/addictivedrums.html><http://www.bigfishaudio.com/4DCGI/detail.html?1475> on Aug. 2009.

(Continued)

*Primary Examiner* — Marlon Fletcher
(74) *Attorney, Agent, or Firm* — Wilmer Cutler Pickering Hale and Dorr LLP

(57) ABSTRACT

A composition tool including a memory capable of storing data and a processor is provided. The processor is configured for using the data such that the composition tool can provide a score interface and a plurality of instrument interfaces, wherein each instrument interface comprising a graphical representation of an instrument and a score section for illustration of at least one part of a musical score. The composition tool can provide a touch screen interface to enable a user to select a portion of the graphical representation of one of the instruments by detecting the user's finger placements on the selected portion of the graphical representation. The composition tool can, in response to the selection of the portion of the graphical representation, provide a representation of at least one musical note that is corresponding to the selected portion of the graphical representation of the instrument in the score section.

15 Claims, 22 Drawing Sheets

(56) References Cited

U.S. PATENT DOCUMENTS

| | | | |
|---|---|---|---|
| 6,740,802 | B1 | 5/2004 | Browne, Jr. |
| 7,034,217 | B2 | 4/2006 | Pachet |
| 2001/0037719 | A1 | 11/2001 | Gardner et al. |
| 2002/0194984 | A1 | 12/2002 | Pachet |
| 2003/0110925 | A1* | 6/2003 | Sitrick et al. ............. 84/477 R |
| 2003/0110926 | A1* | 6/2003 | Sitrick et al. ............. 84/477 R |
| 2006/0117935 | A1* | 6/2006 | Sitrick ..................... 84/477 R |
| 2008/0115657 | A1 | 5/2008 | Wakiyama |
| 2011/0023688 | A1* | 2/2011 | Daisy ....................... 84/483.1 |
| 2012/0137855 | A1 | 6/2012 | Gannon |
| 2014/0041512 | A1* | 2/2014 | Mastran et al. .......... 84/483.2 |

OTHER PUBLICATIONS

Brass by Arturia—printed from <http://www.arturia.com/evolution/en/products/brass/specs.html> on Aug. 2009.

Drum & Bass Rig by M-Audio—printed from <http://www.m-audio.com/products/en us/DrumBassRig-main.html> on Aug. 2009.

DrumCore 2 by Submersible Music—printed from <http://www.submersiblemusic.com/TemplateMain.aspx?contentId=51> on Aug. 2009.

Ethno Instrument by Motu—printed from<http://www.motu.com/products/software/ethno/body.html> on Aug. 2009.

EZ Drummer by Toontrack—printed from <http://www.toontrack.com/ezdrummer.asp> on Aug. 2009.

Fab Four by East West—printed from <http://www.musiciansfriend.com/product/EastWest-FAB-FOUR?sku=706910> on Aug. 2009.

Ivory by Synthogy—printed http://www.synthogy.com/products/ivorygrand.html#features on Aug. 2009.

Music Production Toolkit—printed from<http://www.sweetwater.com/store/detail/MPToolkitLE/>Aug. 2009.

Philharmonik Miroslav by IK Multimedia/classic—printed from <http://www.philharmonik.com/Main.html?prod MP> on Aug. 2009.

Sampled Drum Kits by Ocean Way Drums—printed from <http://www.esoundz.com/details.php?ProductID=1837> on Aug. 2009.

Sibelius 5—printed from<http://www.sibelius.com/products/sibelius/index.html> on Aug. 2009.

\* cited by examiner

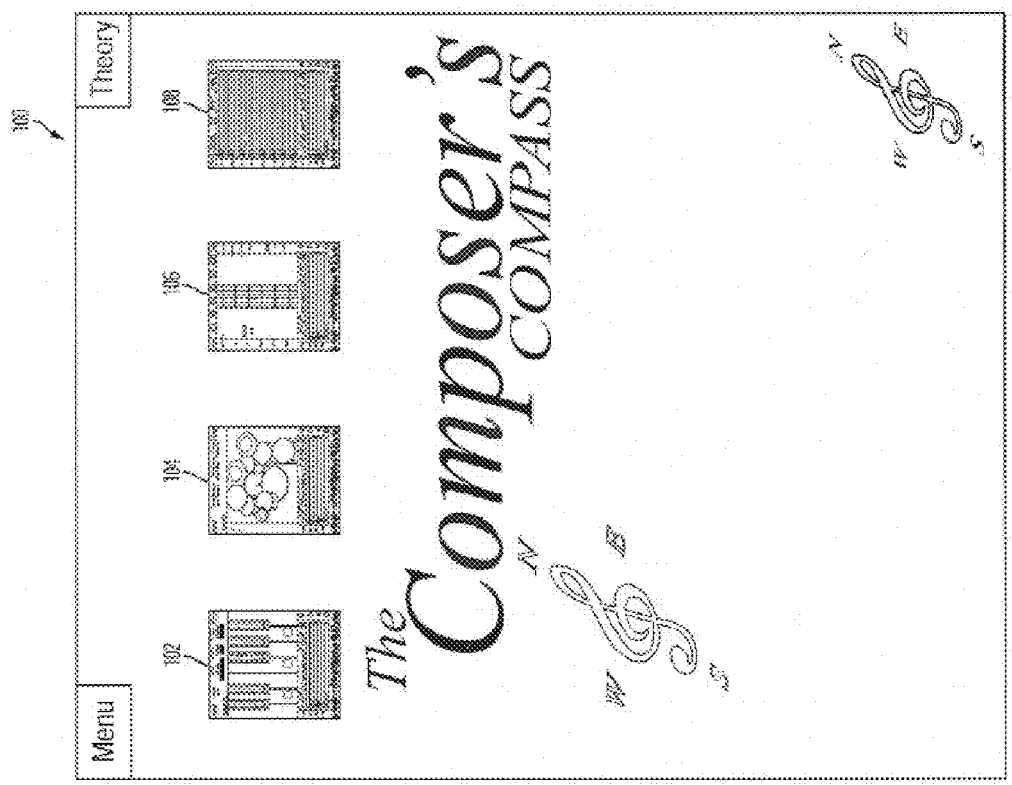

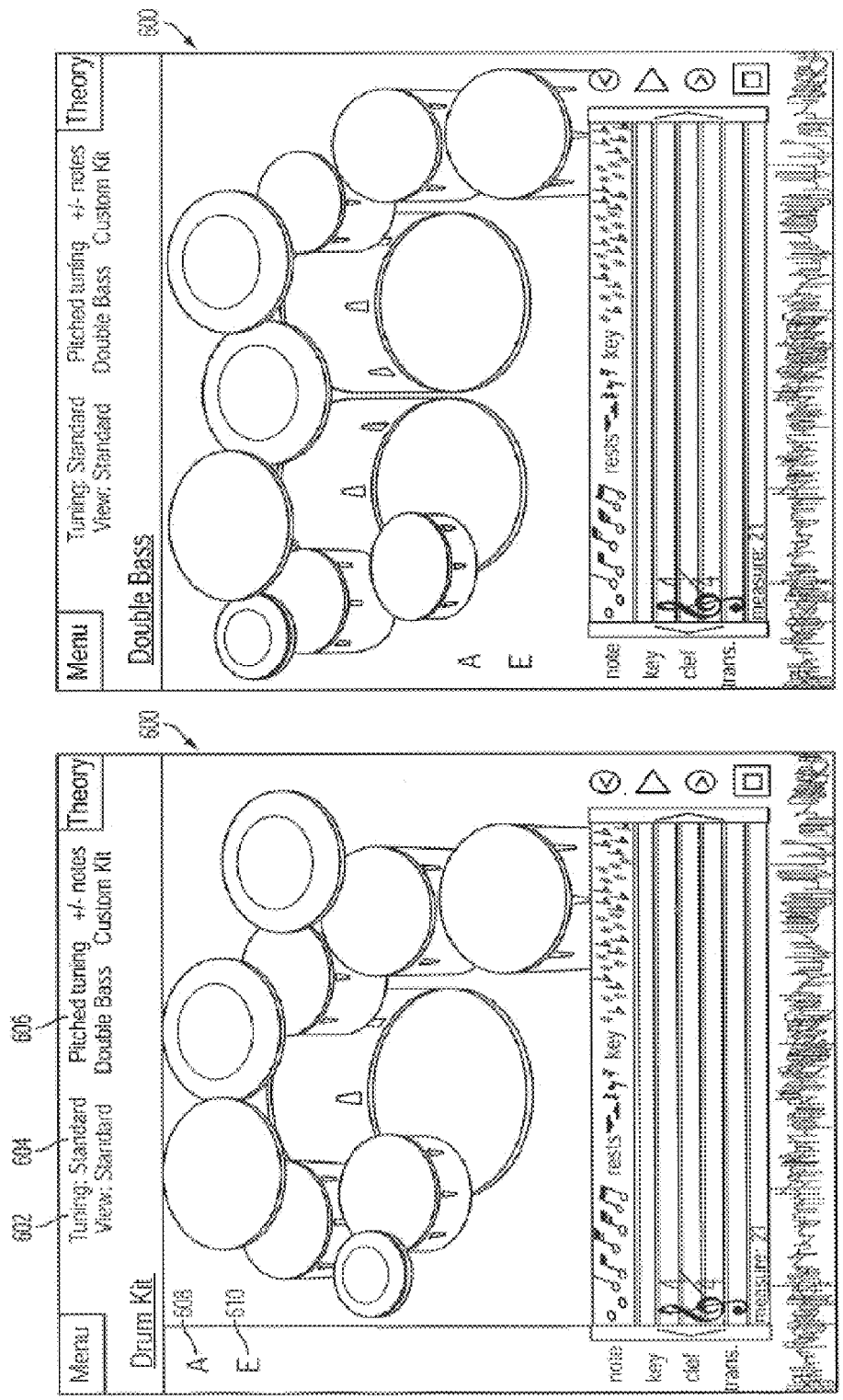

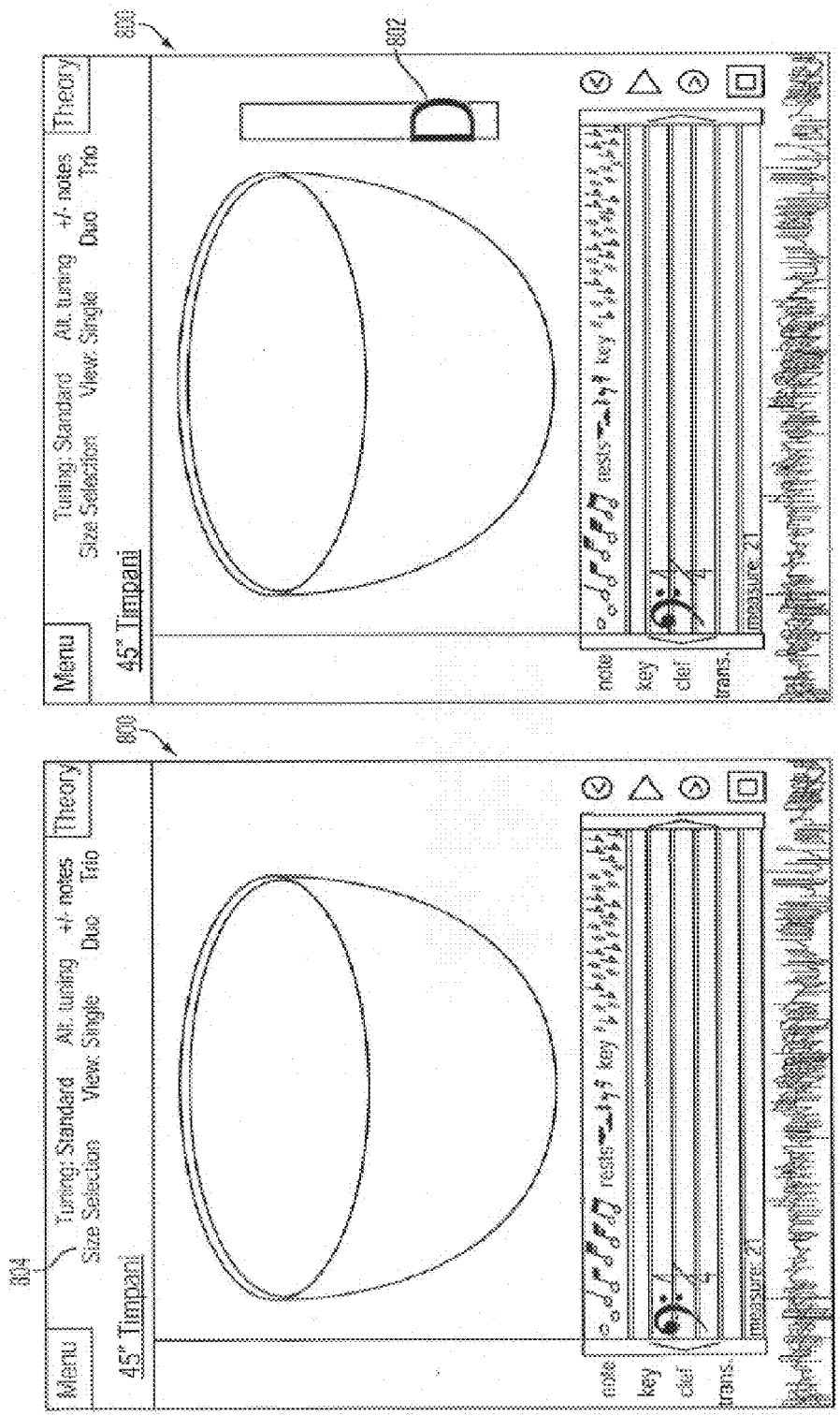

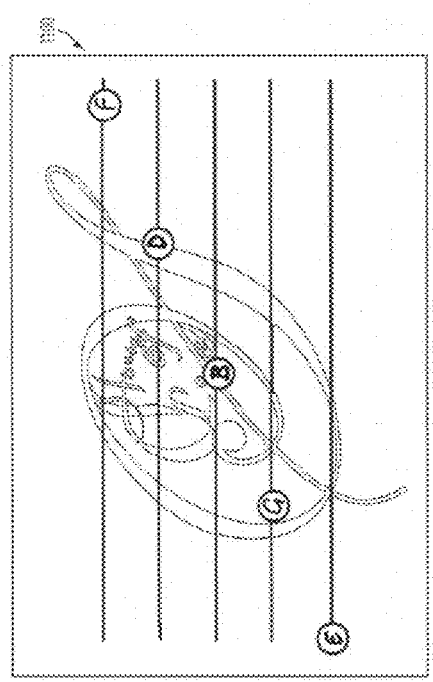
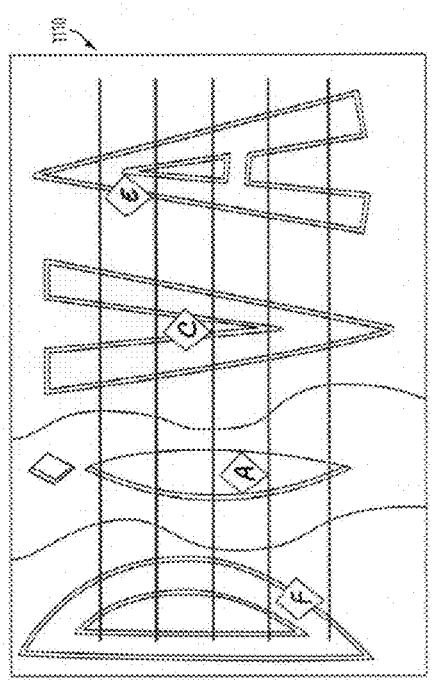
FIG. 11A
FIG. 11B

COMPOSITION DEVICE AND METHODS OF USE

CROSS-REFERENCE TO RELATED APPLICATION

This application is a continuation of U.S. patent application Ser. No. 12/847,831, filed on Jul. 30, 2010, which claims the benefit under 35 U.S.C. §119(e) of U.S. Provisional Patent Application No. 61/230,437, filed Jul. 31, 2009, which is hereby incorporated by reference herein in its entirety.

BACKGROUND

To compose music, a composer may write a score by hand or may use composition software to create the score. When the composer is on the go, however, the composer may find it difficult to compose either by hand or using available composition software. For example, if a composer is composing music for the piano, the composer may find it difficult to compose the music without having the piano on hand. In another example, if a composer is using composition software, the composer may find it difficult to use this software while on the go, since doing so may require use of the composer's home or laptop computer.

Accordingly, it would be desirable to provide a composition device and methods of use, and in particular, a handheld composition device that allows a user to create scores using one or more instrument interfaces.

SUMMARY

A composition device and methods of use are provided.

The composition device described herein, which may be referred to as the "Composer's Compass," provides a composition tool application to help musicians and composers record their ideas as scores which can be printed, for example, and exported for playback as digital media. The composition tool application of the disclosed subject matter may provide any number of interfaces. In some embodiments, the composition tool application may provide, for example, a keyboard interface, a stringed instrument interface, a percussion interface, and a score interface. The keyboard interface may include, for example, a piano interface. The stringed instrument interface may include, for example, a guitar interface. The percussion interface may include, for example, a drum interface. The score interface may, for example, allow a user to score directly to sheet music without the use of an instrument interface, and to arrange the score with all of its parts in view and with playback. In some embodiments, additional instrument interfaces and device options may be available, such as, for example, mallet instruments (e.g., vibraphone, glockenspiel, xylophone, marimba), accordion, brass, woodwinds, orchestral instruments, Latin percussion (e.g., congas, timbales, agogo bells, tamborim), Indian instruments (e.g., sitar, harmonium), Asian instruments (e.g., gamelon, koto, taiko), and guitar add-ons such as resonator guitar or slide options. These instrument interfaces are merely illustrative, and the composition device may include any suitable instrument interfaces or combination thereof.

In some embodiments, a system for creating a musical score is provided that includes a composition tool application. The composition tool application is configured to provide a plurality of instrument interfaces to a user including a keyboard interface, a stringed instrument interface, and a percussion interface. The plurality of instrument interfaces each include a representation of an instrument and a score section for illustration of the musical score. The composition tool application is configured to provide the user with the ability to select a portion of the representation of the instrument and, in response to the selection of the portion of the representation of the instrument, provide a representation of a note for the instrument in the score section.

In one example, the plurality of instrument interfaces include touch screen interfaces, and the composition tool application is further configured to provide the user with the ability to select a portion of the representation of the instrument by touching the portion of the representation of the instrument. In another example, the percussion interface includes a drum interface. In such an example, the composition tool application is further configured to provide the user with an option to select a number of drums for display in the drum interface and provide the user with an option to select a size of the drums for display in the drum interface. In yet another example, the composition tool application is further configured to provide the user with an option to select a pitch for the drums for display in the drum interface.

In still another example, the composition tool application is further configured to provide the user with an option to change a key signature of the score section. In yet another example, the composition tool application is further configured to provide the user with an option to change a time signature of the score section. In still another example, the composition tool application is further configured to provide the user with an option to transpose a note in the score section. In yet another example, the composition tool application is further configured to provide the user with an option to print the musical score. In still another example, the composition tool application is further configured to provide the user with an option to play back the musical score.

In yet another example, the keyboard interface includes a piano interface that provides the user with an octave view comprising one octave of the piano. In still another example, the stringed instrument interface includes a guitar interface.

In yet another example, the composition tool application is further configured to provide a menu interface to the user comprising a selectable menu option, and provide an expandable grid including a plurality of available options in response to a selection of the menu option by the user. In still another example, at least one of the plurality of instrument interfaces provides a theory option. In such an example, the composition tool application is further configured to provide the user with music theory related to an instrument in response to a selection of the theory option. In yet another example, the composition tool application is further configured to provide an arrangement interface to the user that provides the user with options for arranging the musical score and multiple parts of the musical score.

In still another example, the plurality of instrument interfaces include touch screen interfaces, and the composition tool application is further configured to provide the user with the ability to change a notation option of a note in the score section by touching the note. The notation options include a sharp option, a flat option, and a natural option. In yet another example, the composition tool application is further configured to provide the user with the ability to change a length of a note in the score section by touching the note.

In still another example, the system for creating a musical score further includes a handheld computing device having a touch screen, and the composition tool application is provided using the handheld computing device.

In some embodiments, a composition tool is provided for creating a musical score. The composition tool includes a memory capable of storing data and a processor. The processor is configured for using the data such that the composition tool can provide to a user a score interface and a plurality of instrument interfaces. Each instrument interface comprising a graphical representation of an instrument and a score section for illustration of at least one part of a musical score. The composition tool can also provide to the user a touch screen interface to enable the user to select a portion of the graphical representation of one of the instruments by detecting the user's finger placements on the selected portion of the graphical representation of the instrument. In response to the selection of the portion of the graphical representation of the instrument, the composition tool can further provide a representation of at least one musical note that is corresponding to the selected portion of the graphical representation of the instrument in the score section. The score interface is capable of displaying a score having at least one part and allowing a user to assign or de-assign said part of the score to different instruments.

In accordance with the disclosed subject matter, corresponding methods and computer readable media are also provided.

BRIEF DESCRIPTION OF THE DRAWINGS

In the drawings,

FIG. 1 is an illustrative introduction screen that may be provided by the composition tool application in accordance with some embodiments of the disclosed subject matter;

FIGS. 6A-C are illustrative drum kit interface screens that may be provided by the composition tool application in accordance with some embodiments of the disclosed subject matter;

FIGS. 8A-D are illustrative timpani interface screens that may be provided by the composition tool application in accordance with some embodiments of the disclosed subject matter;

Figures 10A, 10B:
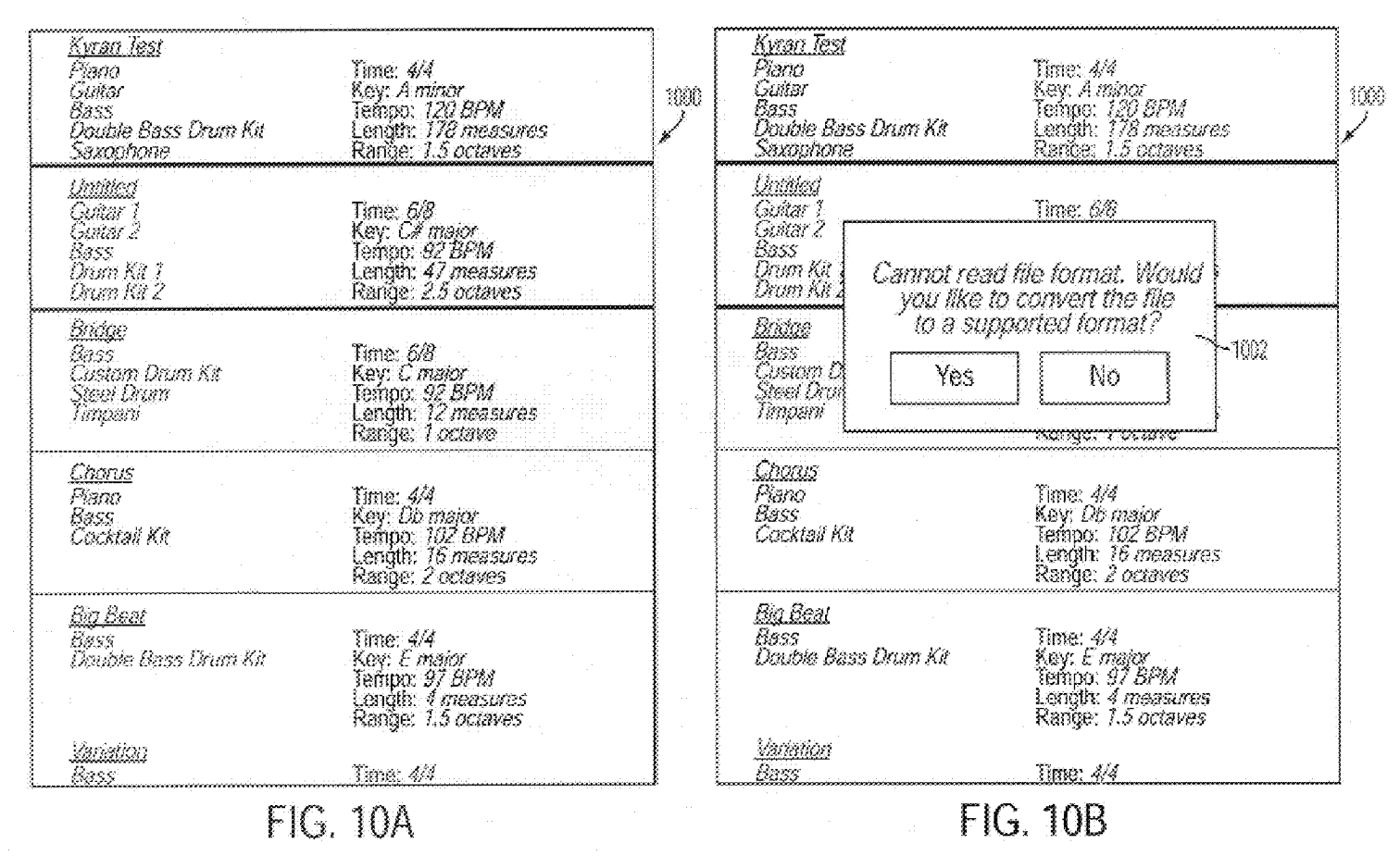

FIGS. 10A-D are illustrative open file interface screens that may be provided by the composition tool application in accordance with some embodiments of the disclosed subject matter;

FIGS. 11A-B are illustrative theory interface screens that may be provided by the composition tool application in accordance with some embodiments of the disclosed subject matter;

DETAILED DESCRIPTION

Figures 2A, 2B:
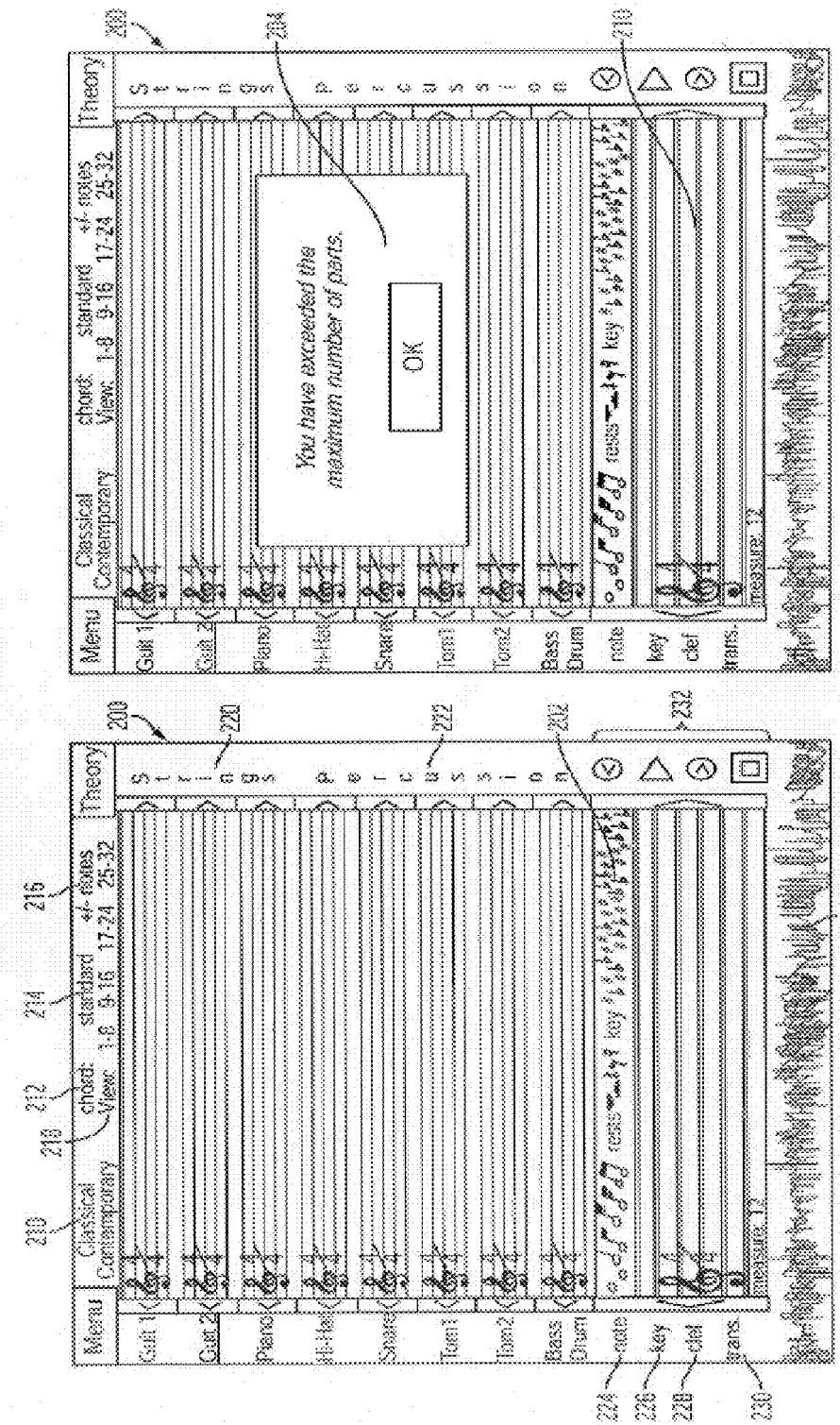
FIGS. 2A-D are illustrative score interface screens that may be provided by the composition tool application in accordance with some embodiments of the disclosed subject matter.
Figure 2D:
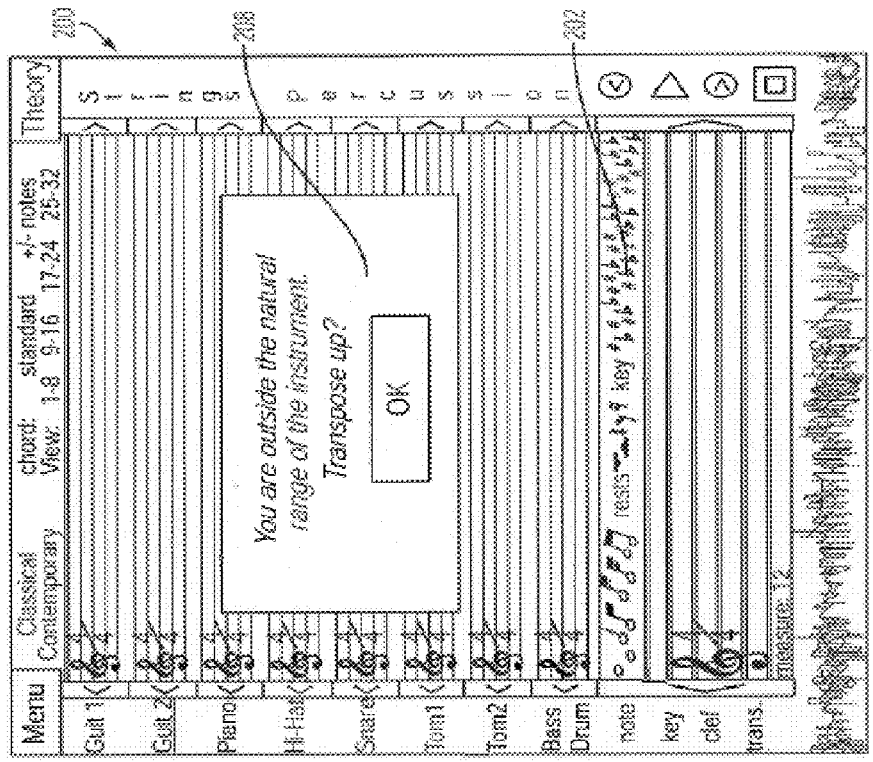
Figure 2C:
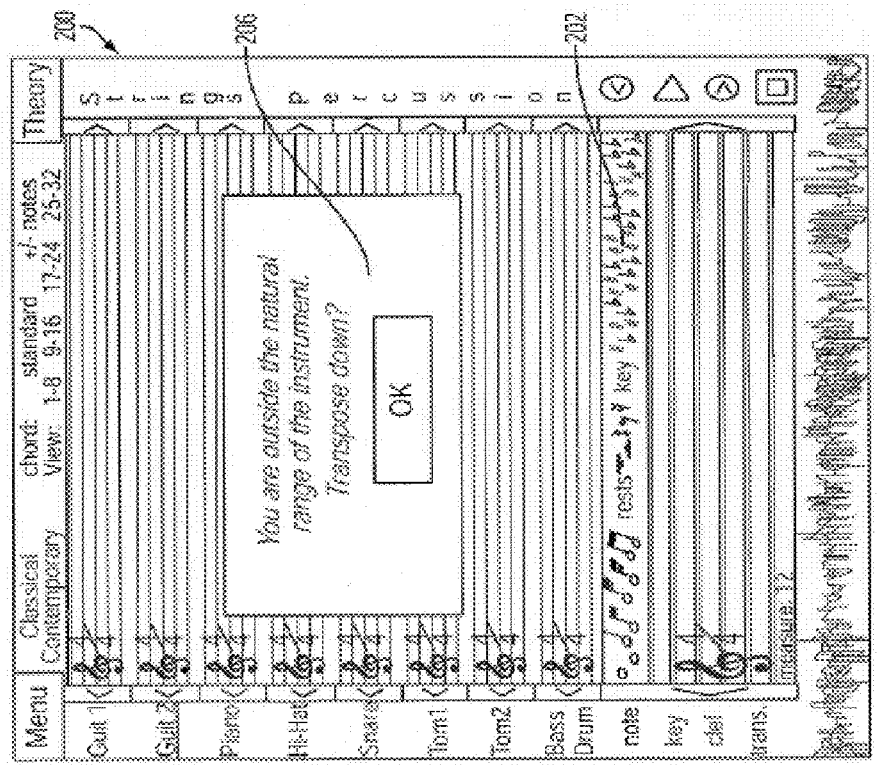

A composition device and methods of use are provided.

The composition device of the disclosed subject matter may include a composition tool application that provides a user with a plurality of interfaces that, for example, allow the user to prepare musical compositions. FIGS. 1-12 provide a plurality of illustrative interfaces that may be provided by the composition tool application in accordance with some embodiments of the disclosed subject matter. The interfaces shown in FIGS. 1-12 are merely illustrative, and any other suitable interfaces may be provided by the composition tool application in accordance with the disclosed subject matter.

FIG. 1 is an illustrative introduction screen 100 that may be provided by the composition tool application in accordance with some embodiments of the disclosed subject matter. Introduction screen 100 may be displayed, for example, at start up of the composition device. Introduction screen 100 may also be referred to as, for example, a "splash screen." Introduction screen 100 may include, for example, the product name, company logo, any other suitable information, or any combination thereof. Introduction screen 100 may include image icons 102, 104, 106, and 108 for the different interface options. Image icons 102-108 may be selected by a user to open each respective interface. Introduction screen 100 may allow for add-ons or software upgrades to be integrated into the composition device. Icons may be provided that represent groupings of further options that may open up to reveal a new screen of icons in the selected group.

FIGS. 2A-D are illustrative score interface screens 200 that may be provided by the composition tool application in accordance with some embodiments of the disclosed subject matter. Score interface screens 200 may be provided for each part of a score, for example. Score interface screens 200 may include a score section 202 at the bottom of the screen for that part of the score. This example is merely illustrative, and the score section 202 may be provided in another suitable portion of the screen. For certain score interface screens 200, a score section 202 may not be included. For example, certain score interface screens may display the entirety of the score.

In some embodiments, score interface screen 200 may display, for example, eight parts per screen and a maximum of thirty-two parts. This example is merely illustrative, and score interface screen 200 may include any suitable number of parts. The composition tool application may provide an error message 204 when the maximum number of parts has been exceeded, for example.

Score interface screen 200 may allow a user to arrange the score. Score interface screen 200 may allow a user to assign or reassign the parts of the score to different instruments. Score interface 200 may provide a user with options to edit parts of the score, transpose parts of the score, create parts directly to the score, any other suitable option, or any suitable combination thereof. If a user designates notes that are outside of the natural range of the instrument, a prompt 206 or 208 may be provided to notify the user of this error and ask whether to transpose the part down or up, respectively, to fit within the natural range of the selected instrument. In some embodiments, the default setting may be to transpose the part up to the lowest available octave within the range, or down to the highest available octave within the range (e.g., depending on where the score falls out of range), to include all of the notes in the score.

Score interface screen 200 may include a "Classical/Contemporary" option 210 that pertains to the percussion grouping in particular. Classical/Contemporary option 210 relates to the difference between scoring the drums as a kit on one staff and parsing them out as individual parts of the score. Score interface screen 200 may include a "Chord" option 212 that allows a user to create a chord out of a selected note. Score interface screen 200 may include a "Standard" option 214 that allows a user to create a standard chord with a selected note as the root note. Score interface screen 200 may include a "+/− notes" option 216 that allows notes to be added or removed from the configuration.

Score interface screen 200 may include a "View" option 218 that allows a composer to select the parts shown in the score interface based on groups of eight at a time. This example is merely illustrative, and "View" option 218 may allow a composer to select any suitable number of parts to include in a group. Score interface screen 200 may include group category options 220 and 222, for example, that allow the composer to select groups and work only on those parts of the score. Individual parts of a score may be selected by selecting the instrument name shown, for example, on the left side of the interface (e.g., Guit 1, Guit 2, Piano, Hi-Hat, Snare, Tom 1, Tom 2, and Bass Drum). The positioning of options as shown in score interface screen 200 is merely illustrative, and any suitable positioning may be used.

Referring back to score section 202, the score section may appear, for example, at the bottom of score interface screen 200. The first line of score section 202 may include note symbols, rests, and key signatures. A user may drag a selected note for placement on the score. For example, a user may use a stylus to drag a note into place. In another example, a user may touch the note symbols to drag them into place using the touch screen. These examples are merely illustrative, and a user may place a note in the score using any suitable approach. The notes in score section 202 may be arranged, for example, by length, from a whole note to a $\frac{1}{128}$ note, with the most common note selections displayed at all times. Touching "note" option 224 may expand the selection to display other available notes. Sharps, flats, and naturals may be selected as well, for example. Rests may follow the same logic as notes, with the most common rests displayed at all times. Selecting a rest may expand the selection to reveal other available options. Score section 202 may display a plurality of keys. Touching "key" on the first line may expand the display and spread out the selections across the line. Touching "key" option 226 to the left of score section 202 allows the user to select the types of keys to be displayed (e.g., major, minor, sharp notation, or flat notation).

By selecting "clef" option 228, displayed to the left of score section 202, a user may select between the treble and bass clef for the part being scored. Touching the numbers of the time signature allows a user to change the time signature to the desired time for the part. Time signatures can be changed at any measure and, for example, applied globally, to a section, or to one measure. Selecting "trans." option 230 allows a user to transpose notes in the score. Selecting transpose option 230 allows the user to highlight and move notes to a new placement in the arrangement or to change the octave of the part. The measure is displayed at the bottom of the section to track its placement in the score. This value may be changed at any time, if for example, one wished to add a part in harmony at a specific point in the arrangement.

Notes may be edited and replaced by, for example, selecting the note and dragging a new note on top of it. Touching the note once may highlight the note. Each subsequent touch of the note, while it is highlighted, may provide a new notation option to add a sharp, flat, or natural notation. While the note is highlighted, touching the note may change the note length with each touch moving through to a new duration selection until the screen is touched elsewhere to deselect the note. In some embodiments, the note length options may be provided after the notation options. Touching a note twice in quick succession may delete the note or, if no note exists, create one at the point of contact on the score.

Score section 202 may display the current measure. Score section 202 may include scroll bars to the right and left of the measure to move backwards and forwards in the score.

Score interface screen 200 may include playback buttons 232 that allow a user to listen to the arrangement at any point in creation. Playback buttons 232 may include rewind, play/pause, fast forward, and stop buttons, for example. A waveform 234 may be displayed, for example, at the bottom of score interface screen 200 to reflect playback.

Each of the instrument interface screens may include a score section 202. The score sections 202 may be substantially the same for the instrument interfaces. Differences between the interfaces are described in the context of each of the instrument interface screens.

FIGS. 3A-D are illustrative guitar interface screens 300 that may be provided by the composition tool application in accordance with some embodiments of the disclosed subject matter. A user may select and place notes on the score in guitar interface screen 300 and may listen via playback. Alternatively, a user may use finger placement on the virtual instrument to select notes for the score.

Figures 3A, 3B:
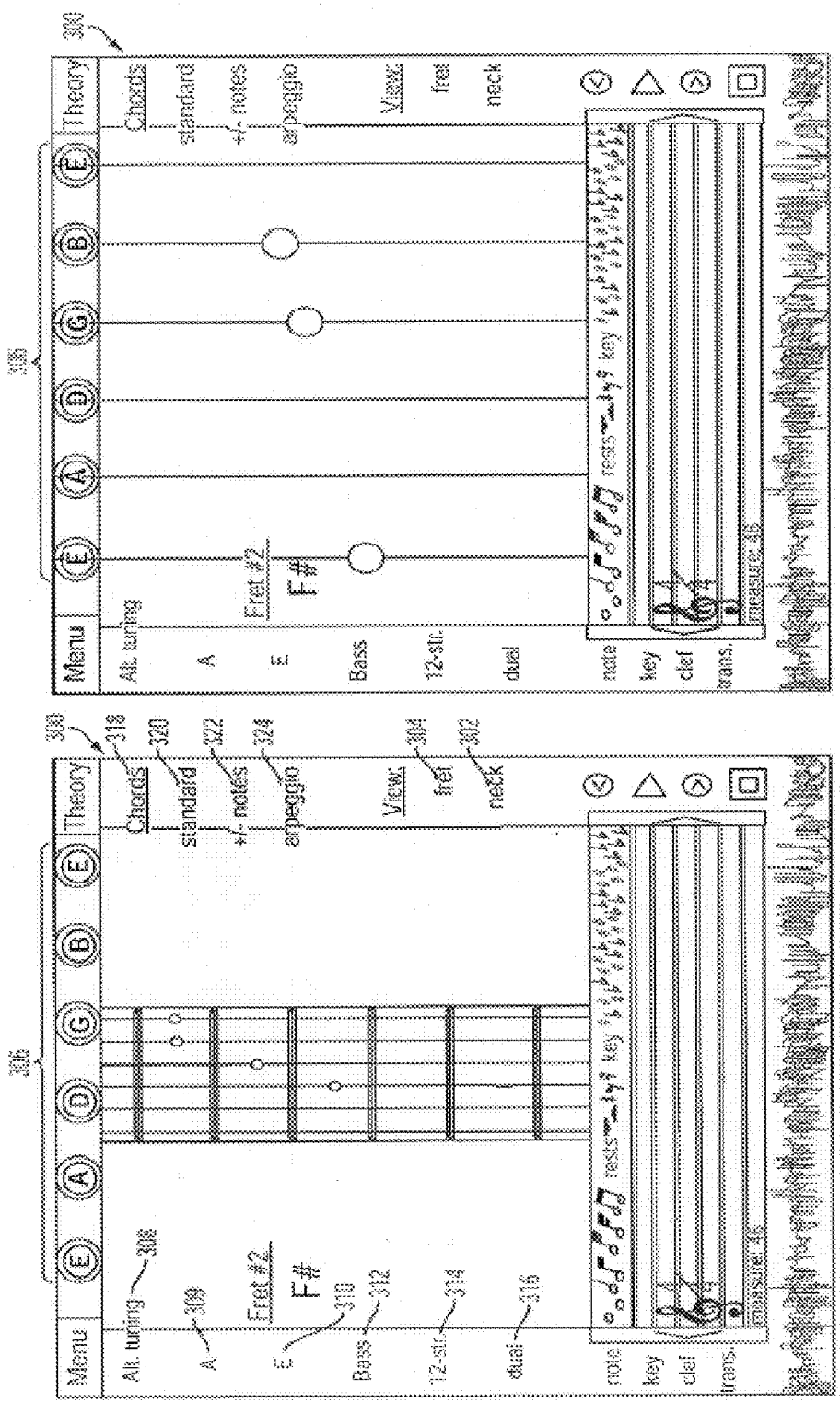
FIGS. 3A-D are illustrative guitar interface screens that may be provided by the composition tool application in accordance with some embodiments of the disclosed subject matter.
Figures 3C, 3D:
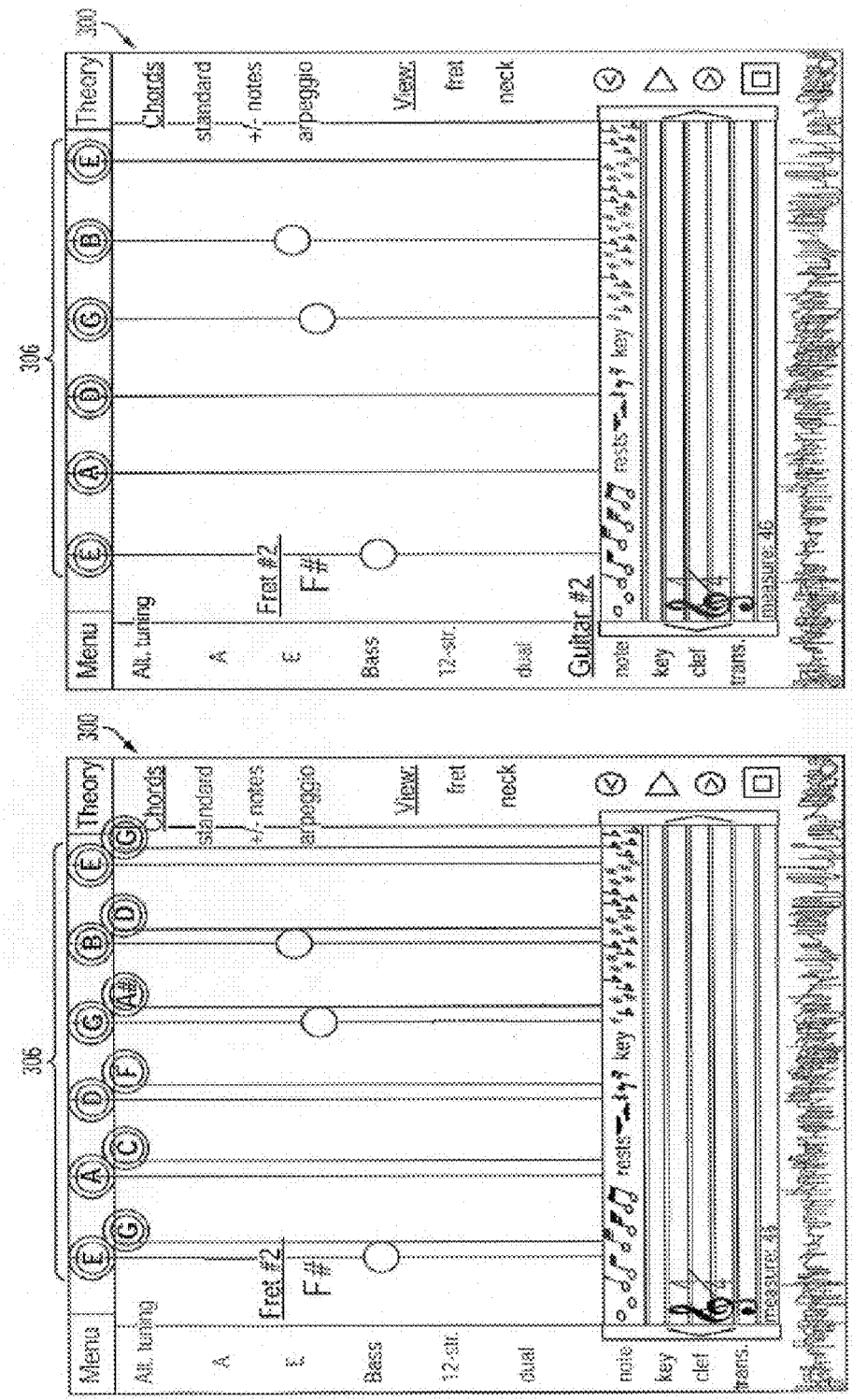
Figures 4A, 4B:
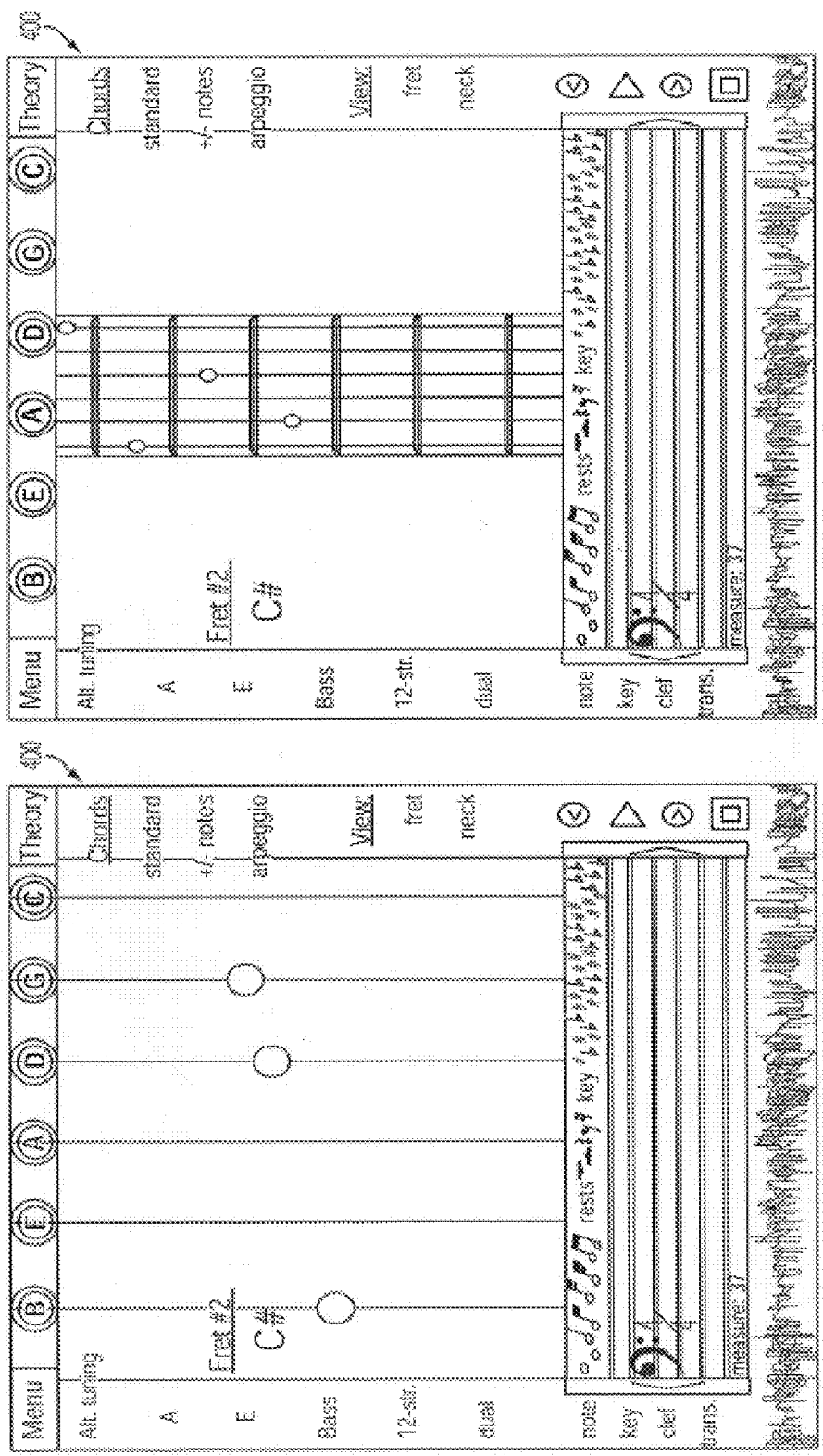
FIGS. 4A-D are illustrative bass guitar interface screens that may be provided by the composition tool application in accordance with some embodiments of the disclosed subject matter.
Figure 4C:
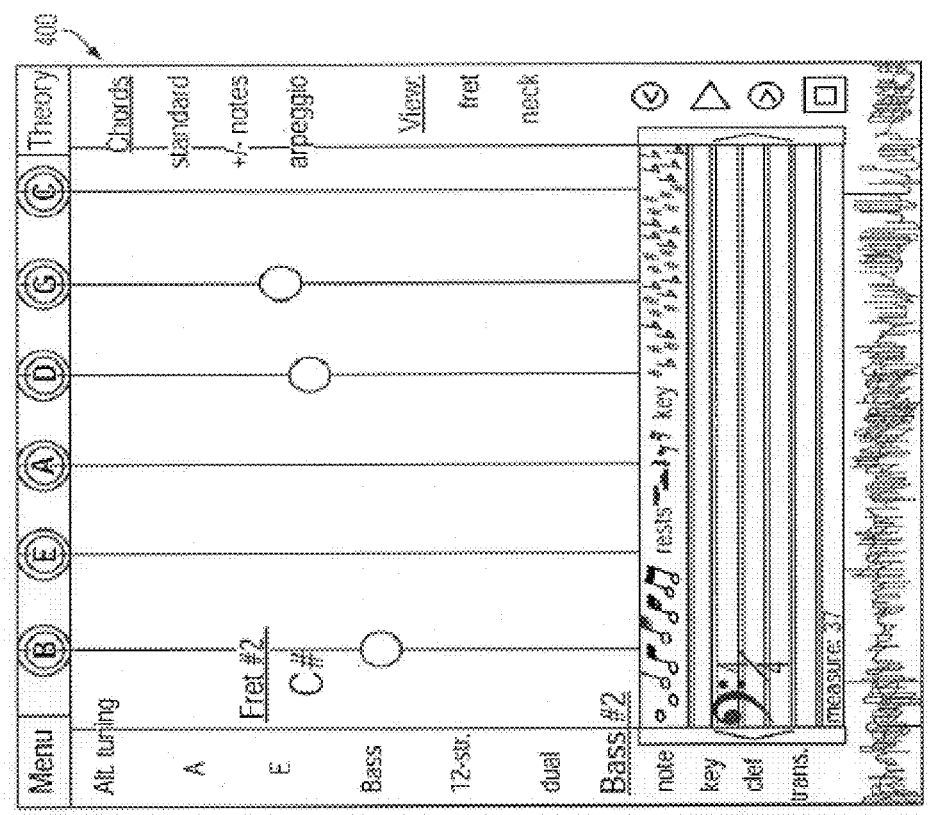
Figure 4D:
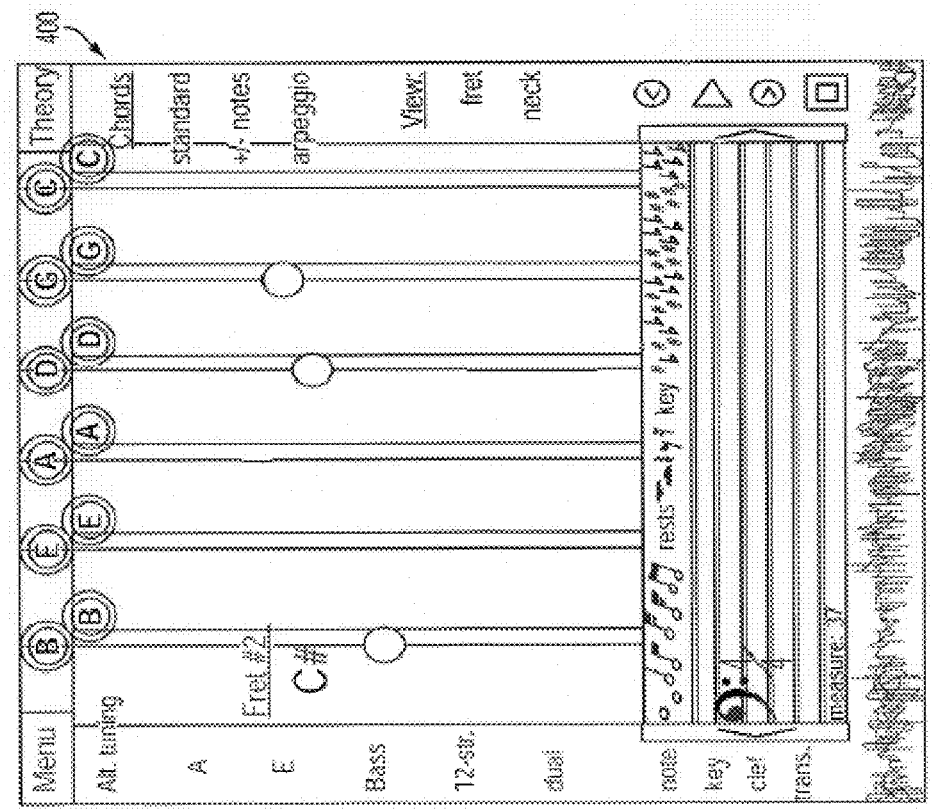

In some embodiments, guitar interface screens 300 may have multiple viewing options. For example, a first viewing option 302, which may be referred to as a neck view, may allow a user to view the full neck of the guitar for note selection, as shown in FIG. 3A. The neck view allows the user to work with a panned out view of the instrument to select notes. In another example, a second viewing option 304, which may be referred to as a fret view, zooms in on the fret that is being selected so that the user can view the strings up close. The fret view is shown in FIGS. 3B, 3C, and 3D. In both the neck and fret views, a user may, for example, use a stylus or touch the screen to scroll up or down the neck of the instrument. Touching the string may, for example, place a finger placement highlight on it. In some embodiments, the device may provide a maximum of five placements to reflect the human hand. In such embodiments, an exception to this may be notes placed in the same fret on consecutive strings or barred notes. Notes may sound when selected by a user and a highlight may appear behind the note as it is played. The fret number and the note currently being selected may appear, for example, to the left of the screen.

Tunings 306 for the open strings may be provided at the top of each string. Touching the tunings may change the value of the note in ascending or descending order. An "Alt tuning" option 308 may be provided to activate this feature for all strings, allowing the user to retune the guitar to a specific tuning. In some embodiments, the default may be the standard tuning for the instrument: E, A, D, G, B, E, with the 12-string default being tuned to the same values one octave higher.

These values may be changed, for example, with alternate tuning or by touching the tuning symbol for that string. Alternate tuning may be set to preset intervals or individual values as desired by the user.

An "A" option 309 may be provided that allows a user to hear the notes as played on an acoustic guitar. An "E" option 310 may be provided that allows the user to hear the notes as played on an electric guitar. A "bass" option 312 may be provided that allows a user to view bass interface screens.

FIGS. 4A-D are illustrative bass guitar interface screens 400 that may be provided by the composition tool application in accordance with some embodiments of the disclosed subject matter. Bass interface screens 400 may replicate the same views and logic as guitar interface screens 300 with sounds as played on a bass guitar. The bass clef may appear on the score and the standard tunings may change to B, E, A, D, G, C, with the 12-string default being tuned to the same values one octave higher.

Referring back to FIGS. 3A-D, a user may select the 12-string view using, for example, "12-str." option 314. A "Dual" option 316 may be provided that allows the user to switch between scores for two guitar parts that can be scored at the same time. If a user selects the playback option, both scores may be played at once in this view. The part being scored is designated by the number 1 or 2. Selecting the number may switch between the parts.

A "Chords" option 318 may be provided that allows the user to create a chord out of a selected note. A "standard" option 320 may be provided that allows a user to create a standard chord with the selected note as the root note, while the "+/− notes" option 322 may allow notes to be added or removed from the configuration. An "Arpeggio" option 324 may be provided that allows a user to hear a note that is scored as a chord played as individual notes in melody as opposed to being strummed.

Figure 5B:
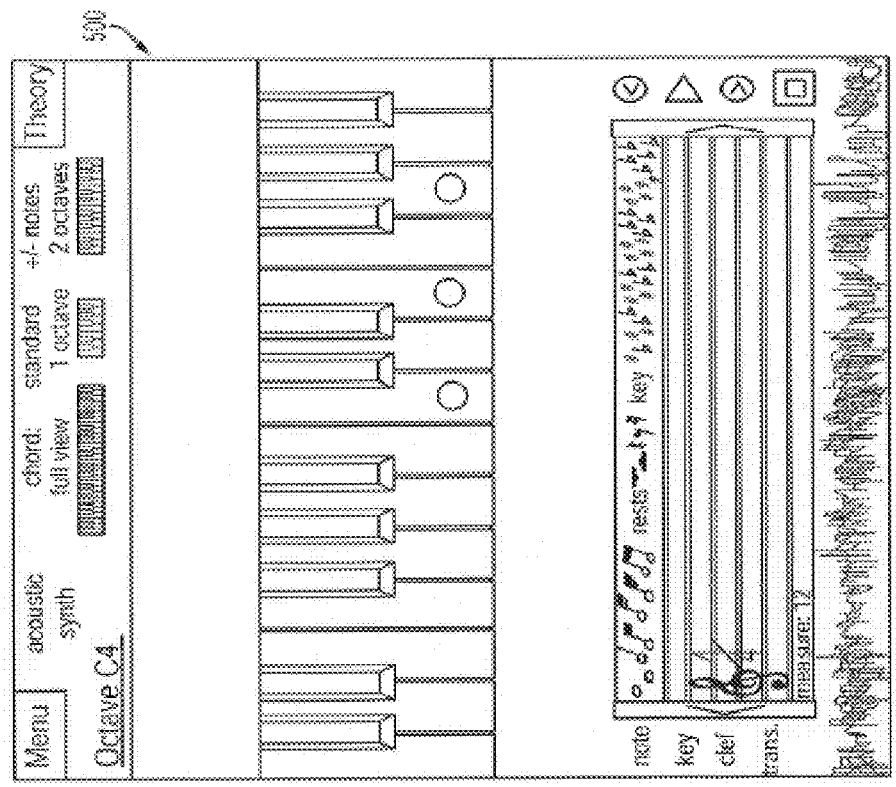
FIGS. 5A-C are illustrative piano interface screens that may be provided by the composition tool application in accordance with some embodiments of the disclosed subject matter.
Figure 5A:
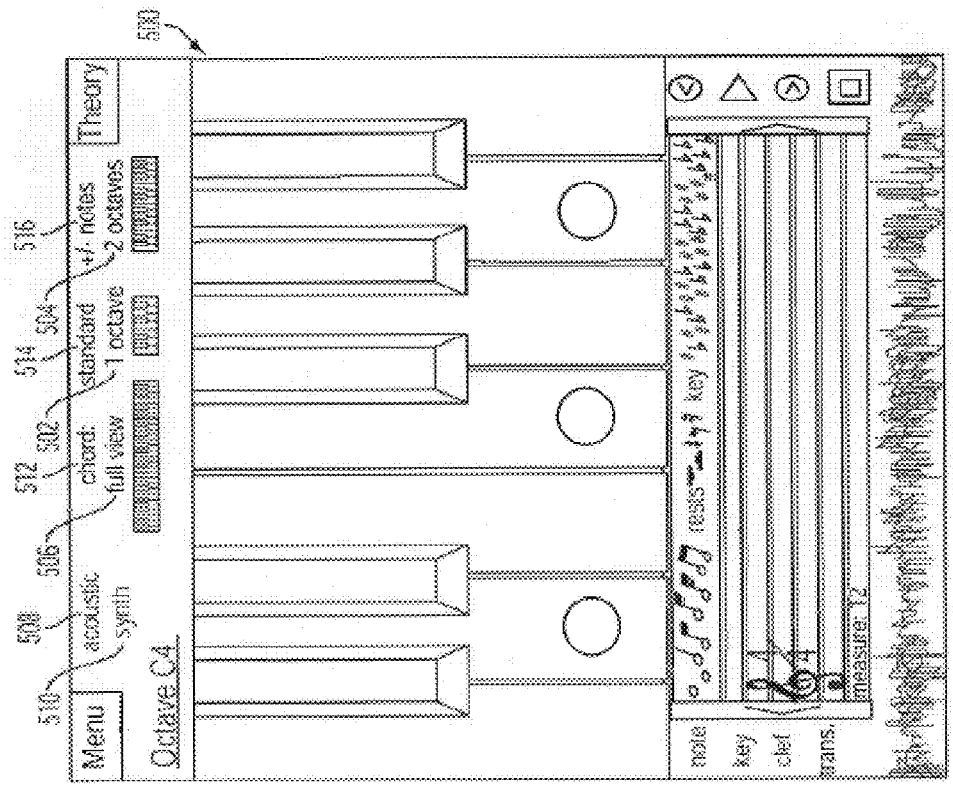
Figure 5C:
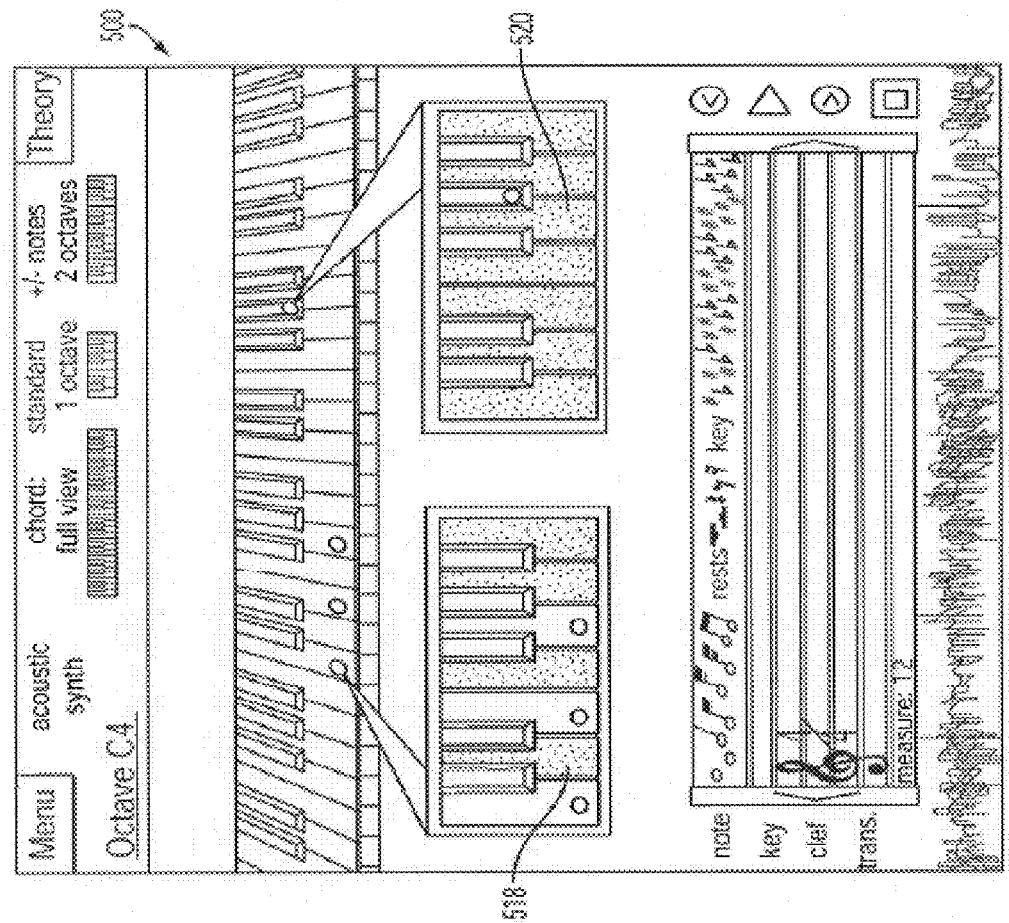

FIGS. 5A-C are illustrative piano interface screens 500 that may be provided by the composition tool application in accordance with some embodiments of the disclosed subject matter. In some embodiments, piano interface screens 500 may provide three different views: one-octave, two-octave, and full view, as shown in FIGS. 5A, 5B, and 5C, respectively. Icons 502, 504, and 506, respectively, may be provided that allow the user to switch between views. The icons may be provided, for example, at the top of piano interface screens 500. The one-octave view, as shown in FIG. 5A, may display a close-up image of one octave within the range of the instrument starting, for example, with C. The two-octave view, as shown in FIG. 5B, may display a two-octave section of the instrument starting, for example, with C. The octave may be displayed at the top left of the screen and may be changed, for example, by dragging the image with touch or using the transposition feature in the score section.

Touching a key on the piano may play back the note and place a finger placement highlight on the selected key. In some embodiments, the application may provide a maximum of ten finger placements to reflect the human hands. A highlight may appear behind the octave selected in the two-octave and full view options, for example. An "acoustic" option 508 may be provided that allows the user to hear the notes as played on an acoustic piano. A "synth" option 510 may be provided that allows the user to hear the notes as played on a synthesizer.

A "Chord" option 512 may be provided that allows the user to create a chord out of a selected note. A "standard" option 514 may be provided that allows a user to create a standard chord with the selected note as the root note, while the "+/− notes" option 516 may allow notes to be added or removed from the configuration.

In full view, for example, as shown in FIG. 5C, the image is panned back and can be scrolled to reach either end of the range. This view may allow a user to score in both the bass and treble clef at once. Window icons 518 and 520 may appear displaying a zoomed-in view of the octave being played by each hand, with highlights on the current notes selected. When chords are played, the root note may be highlighted with a darker color. Notes may be selected, for example, on the piano itself or by selecting keys in the window. Each note being played may be highlighted on the piano image with a finger placement. The clef may shift as the range moves between the treble and bass ranges on the staff.

FIGS. 6A-8D are illustrative drum interface screens that may be provided by the composition tool application in accordance with some embodiments of the disclosed subject matter. The drum interface screens may provide several views, each with their own sub-view options, including, for example, drum kit, steel drum, and timpani. Additional percussion options may be available as add-ons, for example.

Figure 6C:
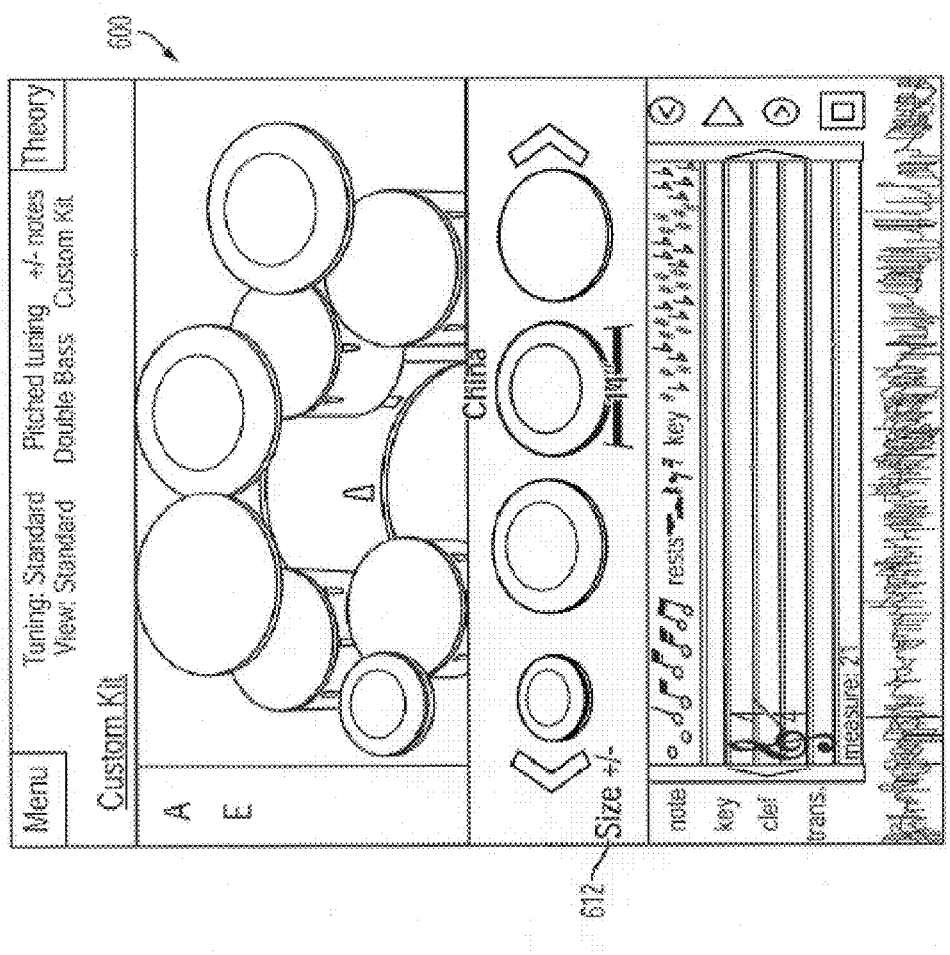

FIGS. 6A-C are illustrative drum kit interface screens 600 that may be provided by the composition tool application in accordance with some embodiments of the disclosed subject matter. The drum kit view is the traditional set-up familiar to pop culture. Tuning option 602 may be provided to a user. For example, a standard tuning option 604 may be provided which changes the score to a drum staff with drum tab notation. In another example, pitched tuning option 606 may be provided which pitches the drums to specific notes to create melody within a percussion ensemble and keeps the treble clef on the staff with music notation that reflects melody. Each drum may be scored separately based on the note to which it is tuned. An "A" option 608 may be provided that allows the user to hear the notes as played on an acoustic drum kit. An "E" option 610 may be provided that allows the user to hear the notes as played on an electronic drum kit.

In some embodiments, the standard viewing option as shown in FIG. 6A may display a traditional drum kit with, for example, four tom tom drums of varying sizes, a snare drum, a variety of cymbals, and a kick drum. A double bass view, as shown in FIG. 6B, may change the arrangement by, for example, adding a second bass drum. A custom drum kit view, as shown in FIG. 6C, may allow the user to select their kit set-up using, for example, a drum rack to select drums and a cymbal rack to select cymbals with sizing options to increase or decrease the diameter of the drum or cymbal being selected. For example, a "Size +/−" option 612 may be provided that allows the user to increase or decrease the size of the drum or cymbal being selected. For example, the user may increase or decrease the size of the drum or cymbal being selected by, for example, dragging up or down when touching the selected instrument or touching the "+" or "−" symbol. Dragging the icon for the instrument being selected, for example, may allow the user to move and position it within the kit and create a unique custom kit. Items may be duplicated in equal or varying sizes. In some embodiments, a maximum of twenty-eight drums kit pieces may be selected. This example is merely illustrative, and any suitable maximum number of pieces may be selected, depending, for example, on the size of the interface.

Figure 7:
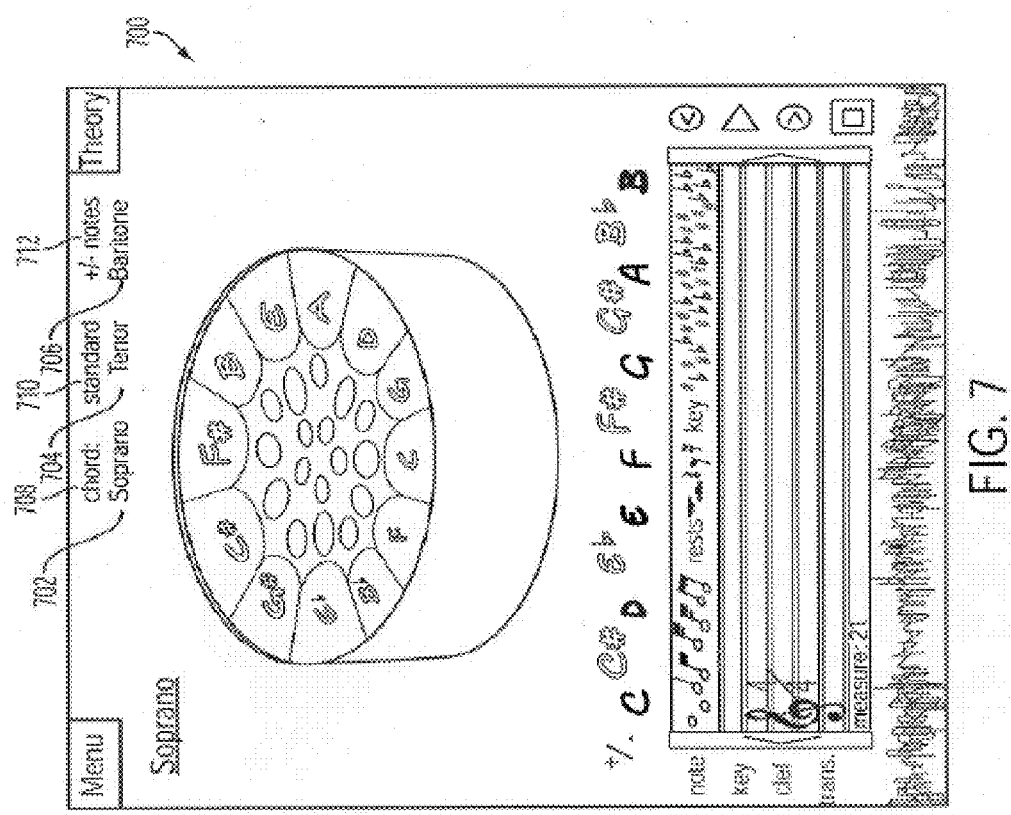
FIG. 7 is an illustrative steel drum interface screen that may be provided by the composition tool application in accordance with some embodiments of the disclosed subject matter.
Figures 8C, 8D:
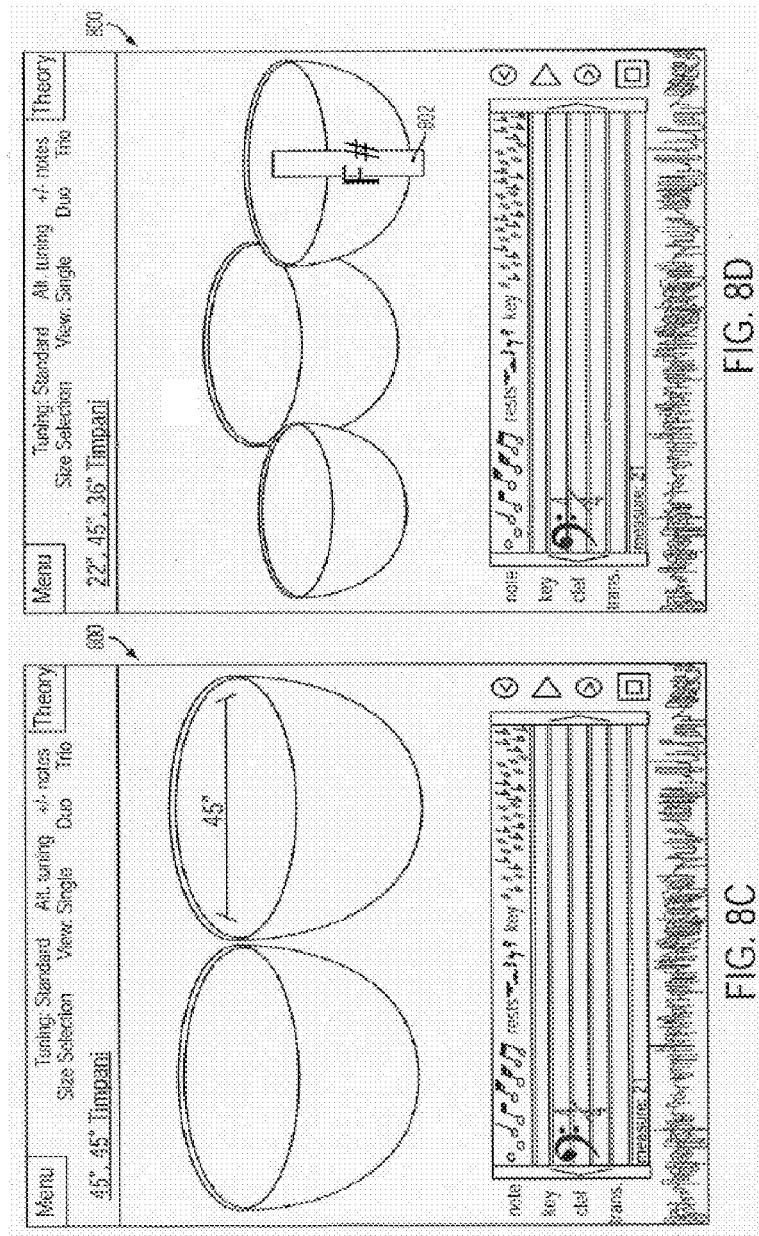

FIG. 7 is an illustrative steel drum interface screen 700 that may be provided by the composition tool application in accordance with some embodiments of the disclosed subject matter. Steel drum interface screen 700 is an example of a melody drum interface. The soprano view of FIG. 7, provided using option 702, may allow the user to score a part for the soprano drum in the ensemble. The notes beneath the drum image allow the user to select the note intended to be played. A "+/−" option may be provided that allows the user to select that note one octave up or down within the range of the instrument. The tenor view option 704 may show the tenor drum in the steel band ensemble. The baritone view option 706 may show the baritone drums in the group. The number of drums in each view may be determined, for example, by the number of notes on the type of drum selected to give a full scale in that range. While there may be one lead melody drum in the soprano range, there may be, for example, 3-6 in the tenor and baritone ranges. The clef may shift as the range moves between the treble and bass ranges on the staff.

A "Chord" option 708 may be provided that allows the user to create a chord out of a selected note. A "standard" option 710 may be provided that allows a user to create a standard chord with the selected note as the root note. A "+/− notes" option 712 may allow notes to be added or removed from the configuration.

FIGS. 8A-D are illustrative timpani interface screens 800 that may be provided by the composition tool application in accordance with some embodiments of the disclosed subject matter. Timpani interface screens 800 are scored on the bass clef. In some embodiments, the interface may have three views: single, duo, and trio. Illustrative single view timpani interface screens 800 are provided in FIGS. 8A and 8B. An illustrative duo view timpani interface screen 800 is provided in FIG. 8C. An illustrative trio view timpani interface screen 800 is provided in FIG. 8D.

A plurality of tuning options may be provided that allow for standard tuning of the instrument or alternate tuning. The instrument may be tuned up or down, for example, by touching the "+/−" symbols. The range of the drum 802 may be displayed, for example, next to the drum in the single view and in front of the selected drum in the duo and trio views. The note the instrument is tuned to may be displayed as the instrument is tuned up or down. A "Size Selection" option 804 may be provided that allows a user to increase or decrease the diameter of the drum based on common or custom sizes. A diameter measurement may be provided across the top of the drum. Drums may be sized to be of equal or different sizes. The size of the drums may be provided, for example, in the upper left of the interface in order of appearance on the screen.

Figure 9:
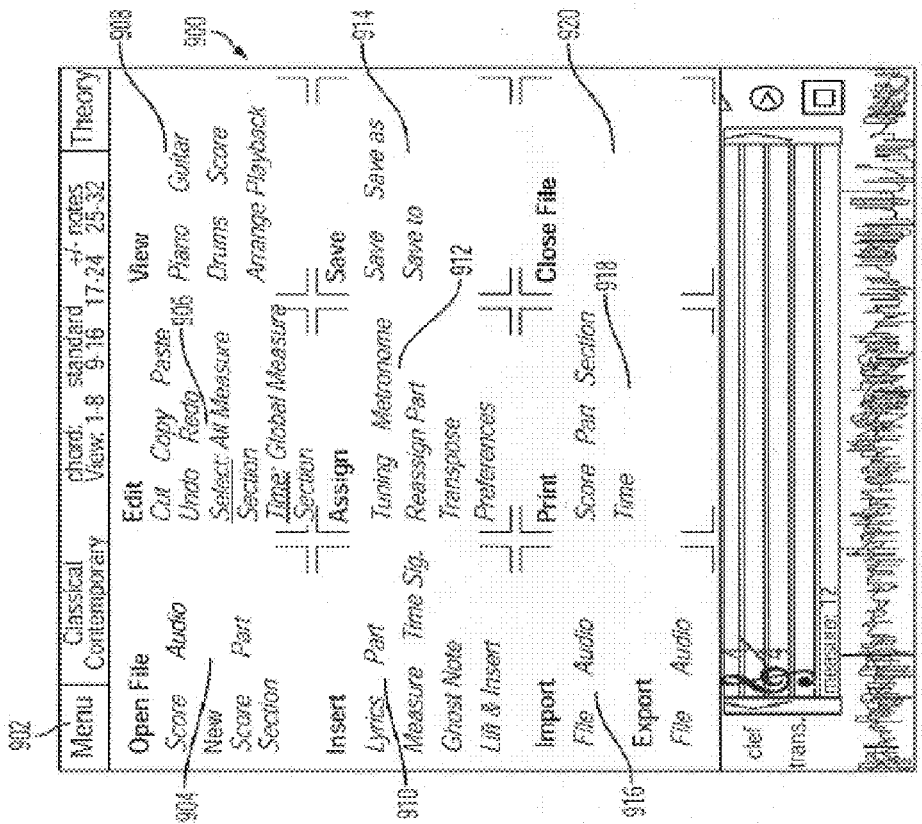
FIG. 9 is an illustrative menu interface screen that may be provided by the composition tool application in accordance with some embodiments of the disclosed subject matter.
Figures 10C, 10D:
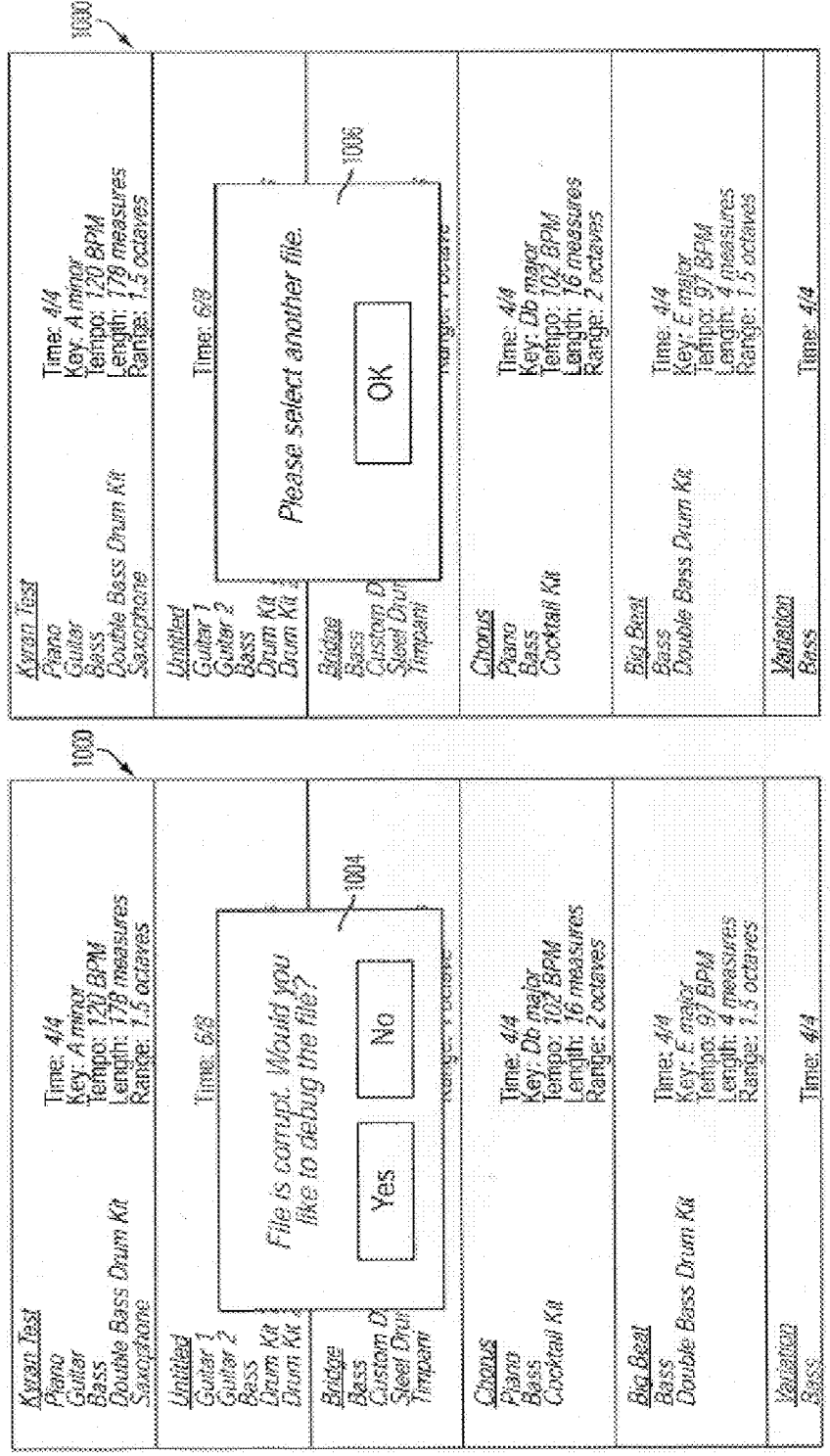

FIG. 9 is an illustrative menu interface screen 900 that may be provided by the composition tool application in accordance with some embodiments of the disclosed subject matter. A menu button 902 may appear on every interface, for example, to allow the composer to access options not displayed on the interface, options that they do not recognize are on the interface, or options that the user feels more comfortable accessing from the menu. Menu button 902 may be provided in the top left corner of menu interface screen 900, for example. Menu button 902 may be expanded to show all options by, for example, touching the corner of a box on the grid. Touching the grid outside of the expanded box may, for example, cause the box to shrink back to the grid. Touching outside of the menu grid may, for example, cause the menu to close.

Menu interface screen 900 may include an open file option 904. Open file option 904 may allow a user to open an existing file, examples being score or audio, or create a new file as a score, part, or section. A "Score" option may be provided to create a full score that can be filled in and parts can be assigned. A "Part" option may be provided to create a part that can be added to an existing score or that a score can be built around. A "Section" option may be provided that functions similarly, but pertains to a piece of the score and can be added to a part or full score. A section may include, for example, several instrument parts across a span of time that do not comprise a full score on their own (e.g., flute, harp, timpani, etc.). From the home screen a user may, for example, use open file option 904 to open the score interface, while selecting this option in an already open interface may open that part of the score.

FIGS. 10A-D are illustrative open file interface screens 1000 that may be provided by the composition tool application in accordance with some embodiments of the disclosed subject matter. Opening an audio file may open the playback interface to allow playback of the audio file. Playback can occur in any interface. Audio playback of an imported file may occur in the playback interface since no existing score may be available to accompany it. The selection options may appear, for example, with details of the score in view for further reference (e.g., a list of instrument parts in the score, time signature, key, tempo, length of score in measures, and range of the score from highest to lowest note). The selected file may be highlighted and the list may be scrolled through using, for example, the touch screen. Double clicking on the file may open it and return the composer to the designated interface.

Possible errors may be provided to a user. For example, an error message 1002 may be provided in the case of an audio file format that is not supported by the device (e.g., for imported files not created by the device) or if the file is corrupt. An option 1004 may be provided to convert or debug the file and, if these operations fail, the composer may be asked to select again using option 1006.

Referring back to FIG. 9, an Edit option 906 may be provided to further provide a selection of options that allow a composer to, for example, copy, cut, and paste notes, measures or sections, to undo and redo, to select an entire score or part, select a measure, select a section of multiple measures across time and including multiple parts, or any other suitable option. Time may also be edited and applied globally, to a specific measure, or to a section of the score. This allows the time signature to change at a given point in the score (e.g., from 4/4 to 3/4) and the tempo to be designated (e.g., allegro). The key may be edited in similar fashion.

A "View" option 908 may be provided that allows a composer to switch between interfaces while, for example, working on a score or creating new pieces. All of the stored interfaces may be shown for selection and this section may update with additional interfaces as add-ons are purchased and loaded onto the device.

An "Insert" option 910 may be provided that allows the addition of lyrics to a scored part, for example, a melody line designation for a lead vocal or a background designation for an accompanying part of the score. Lyrics may be inserted based on note length to syllable ratios and may allow the length of the notes to change to reflect the necessary increase in speed needed to deliver the vocal. For example, one syllable may be assigned to one ¼ note as compared to 5 syllables to one ¼ note. In the case of the latter, the time would be redistributed to give each syllable its own 1/16 note, and time may be borrowed from the note preceding or directly following it to reflect the speed needed to deliver the vocal. The overall time of the measure will not change and will keep within the time signature. Parts may be inserted as well as measures inserted to add to a specified part.

Time signatures may be inserted at specific points in the score to allow the user to change the time of every measure if desired. A new key signature may be inserted at any point in the score to allow for similar changes.

Ghost notes or grace notes may be inserted. These notes may be notated differently, for example, with size variations, and may add or borrow time from the notes to which they are linked. In one example, these notes may appear in gray in the score.

Lift and insert options may be provided that allow a composer to "lift" a part from one place in the score and "insert" it in another part of the same part or a different instrument. The selected piece may be inserted in several ways to add the insertion by extending the time; to replace a part that is shorter, longer, or of the same length; to add the notes as ghost notes in the selected measures; or to overlay the notes, which will add them, at the point of overlay, at full note value to the existing measures and redistribute them across time to fit the time signature. For example, a 4/4 arrangement may be inserted where a measure of four notes—C, D, F#, E—in 4/4 time are overlaid starting before the third note of the existing measure—G, A, B, F. The new arrangement would insert the notes in alternating fashion until the appropriate time plays out, in this case two measures. The new arrangement would be G, A, C, B, D, F, F# E. In the case of a piano this can represent two hands playing in different octaves at the same time.

An "Assign" option 912 may be provided that allows a composer to, for example, assign alternate tuning of the instrument, turn on or off the metronome feature to use as a guide in creation, to transpose or reassign parts to different instruments, to define preferences in the program (e.g., default tuning for an instrument interface), or any other suitable option.

A "Save" option 914 may be provided that provides a composer with a plurality of save options such as, for example, saving a part or score, saving a file under another name, saving a part, section or full score to an existing score, or any other suitable option.

An "Import" option 916 may be provided that provides a composer with options to import score files and audio for playback. The "Import" option may include export features that allow the device to export a score to be printed (e.g., as a PDF, TIFF or JPEG) or to export a score as audio in a variety of formats (e.g., as an MP3, WAV, AIF, MIDI).

A "Print" option 918 may be provided that allows a composer to print from the composition device to a printer. The composer may print the full score, an individual part of the score, or a section of the score (e.g., strings, woodwinds, etc.).

A "Close File" option 920 may be provided that allows a composer to close a file without closing the interface.

FIGS. 11A-B are illustrative theory interface screens 1100 and 1110, respectively, that may be provided by the composition tool application in accordance with some embodiments of the disclosed subject matter. The composition device may provide an option located, for example, on the upper right of the interface that provides the music theory behind selection options in the interface. In some embodiments, this button may appear in every interface and as an icon on the home page. If selected from the home page, for example, it may open as an e-book that can be read on the device and can be searched for easy reference. In other instances, for example, it may open to the part of the e-book related to the item or section selected on the interface with theory related to the instrument of the interface as well as score. Search options may be provided when used in an interface.

Figure 12B:
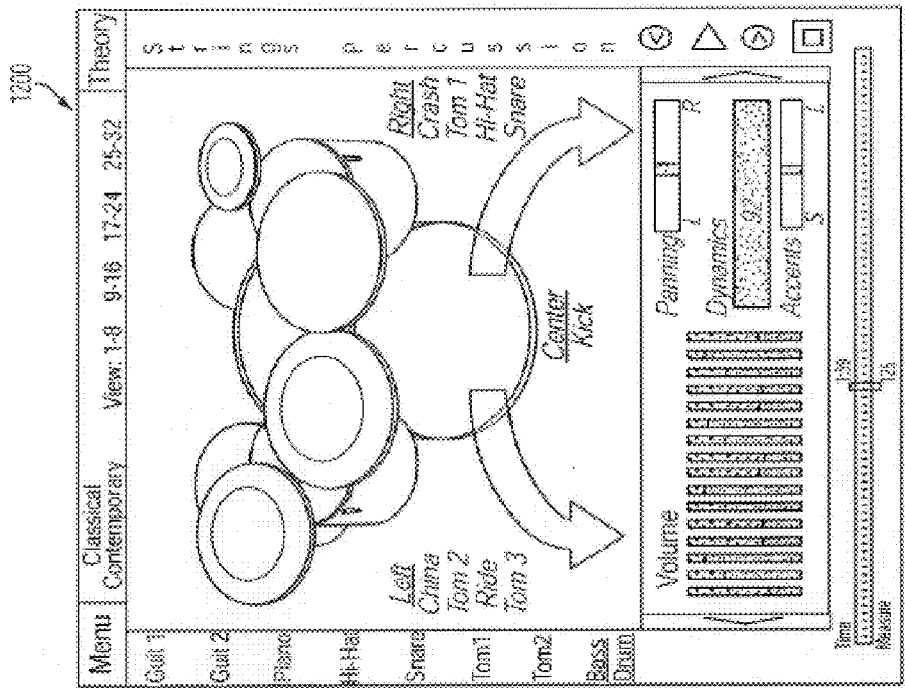
FIGS. 12A-C are illustrative playback interface screens that may be provided by the composition tool application in accordance with some embodiments of the disclosed subject matter.
Figure 12A:
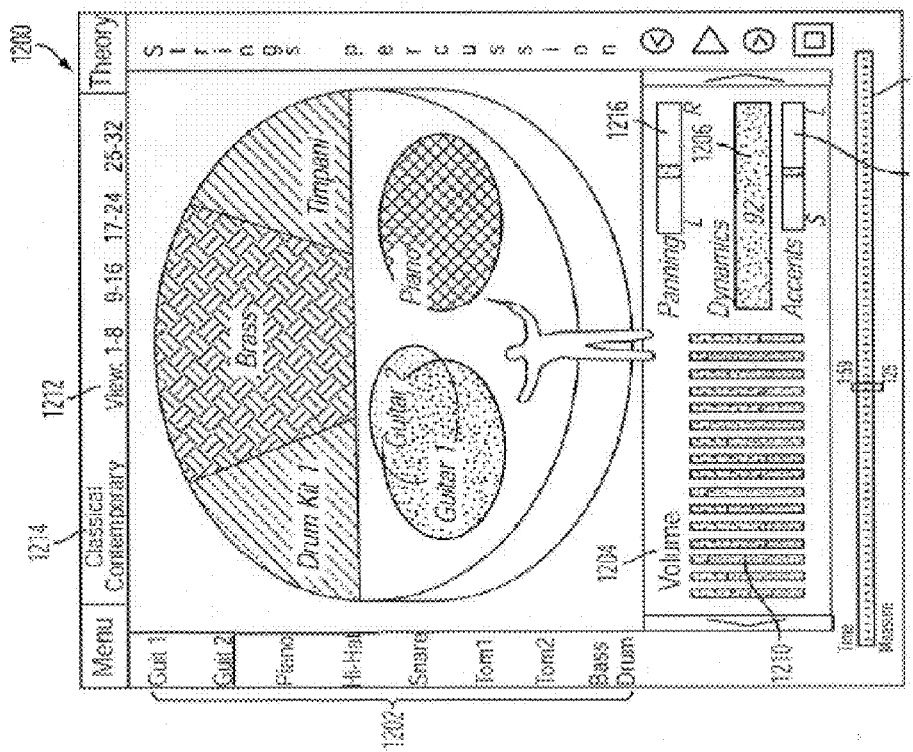
Figure 12C:
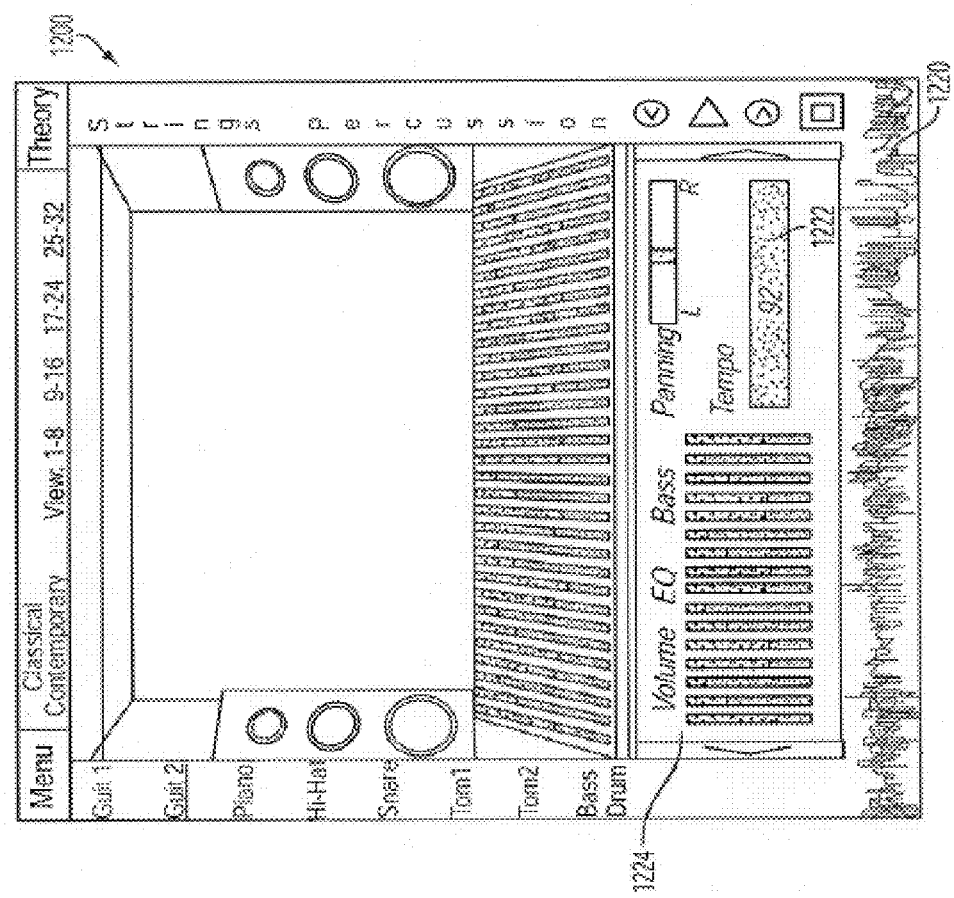

FIGS. 12A-C are illustrative playback interface screens 1200 that may be provided by the composition tool application in accordance with some embodiments of the disclosed subject matter. FIG. 12A provides an arrangement view that presents the composer with the process of performing the piece on stage. The arrangement of the piece may be determined, for example, by the placement of the instruments and the volume of each instrument or group. Selections may be made by single instrument by, for example, double tapping the icon for the instrument group listed. For example, "Drum Kit" may open up to reveal the kit as set up to create the score, as shown in FIG. 12B, for example. In some embodiments, the default setting is for the sound to be panned from left to right based on the configuration used for the score being arranged. Changing this configuration may result in the score rearranging to reflect the changes made. Brass is yet another example.

Selecting the instrument parts 1202 to the left of the interface may highlight that instrument in the arrangement view to allow a user to interact with that part of the score in playback. A user may increase or decrease the volume of the instrument using the instrument settings, which may appear in the "Playback" section 1204, which may replace score section 202 in this interface.

The arrangement view may allow playback to determine the dynamics of the piece. A gauge 1206 may be provided to assign the dynamic to the selected part, allowing the composer to increase the levels slightly for subtle differences in playing style, or increase or decrease the levels vastly or abruptly for crescendo or decrescendo. Dynamic gauge 1206 may affect how loud the instrument is played. Using the gauge between notes, for example, can adjust the dynamic to make one note sound softer and the other much louder. Over a series of notes this can create a crescendo or vice versa. In a symphony, this is how the musicians would interpret the music to give it inflection so that all of the notes are not played at the same level or style.

There is a progression from soft to loud in music theory. The gauge settings and changes as the score is played back may create notations on the score printout that can be used for musicians to interpret the piece as composed and intended by the composer. Illustrative dynamics are as follows: p or piano, meaning "soft"; f or forte, meaning "loud," "strong," or "deep." More subtle degrees of loudness or softness are indicated by: mp, standing for mezzo-piano, meaning "moderately soft"; mf, standing for mezzo-forte, meaning "moderately loud." Beyond f and p, there are also: ff, standing for "fortissimo," and meaning "very loud"; pp, standing for "pianissimo," and meaning "very soft." The following are illustrative changes in dynamics: al niente: to nothing; fade to silence; calando: becoming smaller; crescendo: becoming louder; da niente: from nothing; out of silence; decrescendo or diminuendo: becoming softer; in rilievo: in relief (French en dehors: outwards); indicates that a particular instrument or part is to play louder than the others so as to stand out over the ensemble. In the circle of A. Schoenberg, this expression had been replaced by the letter "H" (for German, "Hauptstimme"), with an added horizontal line at the letter's top, pointing to the right, the end of this passage to be marked by the symbol "]"; perdendo or perdendosi: losing volume, fading into nothing, dying away; morendo: dying away.

An accent gauge 1208 may be provided to create staccato or legato effects by increasing or decreasing the attack of the playing style. This may be done, for example, by section, by selecting the instrument grouping (e.g., on the right of the screen), or by individual instrument by selecting the part for that instrument (e.g., on the left of the screen). Dynamic notation may appear on the score to reflect the dynamics set for the arrangement.

Volume settings 1210 may be provided to allow the composer to balance the instrument within the arrangement, either individually or in a group of up to sixteen parts, for example, with one bar relating to the parts in the order that they appear on the score. View controls 1212 may be provided, for example, at the top of the interface to allow selection of which group of parts are to appear in the volume settings and on the interface. Classical and contemporary options 1214 may be the same as in the score interface and pertain to the scoring of percussion instruments, drum kit vs. orchestral, which in the case of the latter, may score each instrument separately and ultimately effect how the score is prepared. Parts being affected may appear, for example, to the left of the interface, with the part being affected highlighted. A panning gauge 1216 may be provided that allows the composer to move the sound in relation to its placement on the stage.

These settings may be recorded measure by measure so that the dynamics, panning, and volume settings may be altered multiple times throughout the score allowing movement of the music in performance. This may be helpful in non-orchestral compositions, where the instruments are not usually in fixed positions for a performance. It may give the composer an idea of how the song is to be mixed for recording.

The waveform that appears in the score section may be replaced with a time gauge 1218 that tracks both the time and measure of playback and allows the composer to rewind or fast-forward to specific points in playback for further work.

Playback interface screens 1200 may allow the composer to hear the score as a demo, based on the dynamics set in the arrangement view and the song as it was scored. In the view of FIG. 12C, the composer may listen to the composition in a studio setting. Playback section 1204 may have the same settings with certain differences. In some embodiments, there may be three differences between the interfaces. For example, in this view, waveform 1220 may be provided, the dynamics gauge may be replaced with a tempo gauge 1222, which affects all parts in the score and allows the speed of the playback to be determined (advanced options may allow specific tempo settings for each instrument or at sections in the score), and in addition to affecting the volume settings there may be EQ settings 1224 that can be applied to each track in the mixer. In some embodiments, the mixer may show the levels of all 32 tracks and 16 can be manipulated at a time in the playback section. This is merely illustrative, and any suitable number of tracks may be shown or manipulated at a time.

View controls (e.g., at the top) may allow selection of which group of parts is to appear in the volume and EQ settings and on the interface. Classical and contemporary options may be the same as in the score interface and pertain to the scoring of percussion instruments, drum kit vs. orchestral, which in the case of the latter, will score each instrument separately and ultimately effect how the score is prepared. There may be a bass selection to increase the bass in the playback. Once the song is prepared for exporting, the composer may export the score as an audio recording.

Figure 13A:
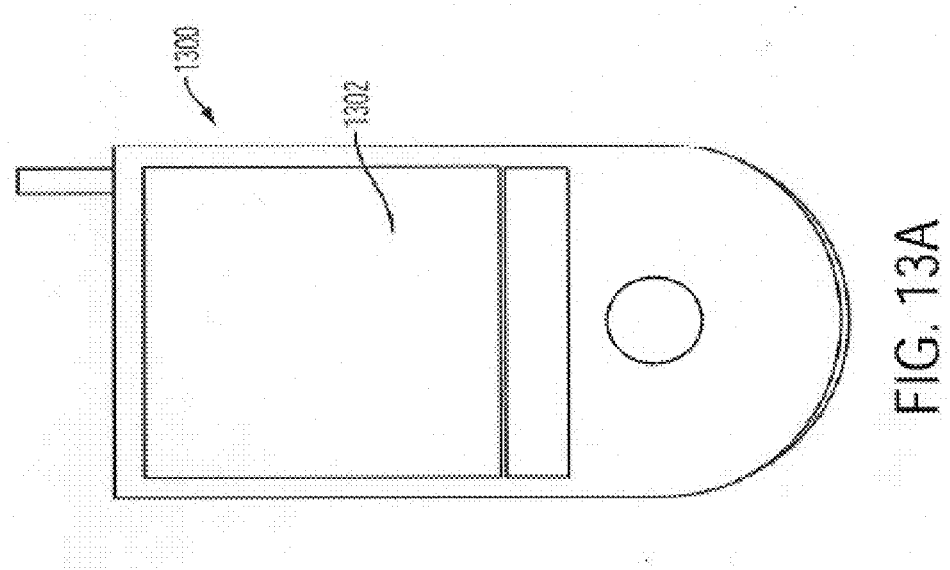
FIG. 13A is a top plan view of an illustrative composition device for implementing the composition tool application in accordance with some embodiments of the disclosed subject matter.
Figure 13B:
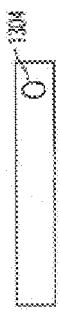
FIGS. 13B-E are top, left side, right side, and bottom views, respectively, of the illustrative composition device of FIG. 13A in accordance with some embodiments of the disclosed subject matter.

FIGS. 13A-E are views of an illustrative composition device 1300 for implementing the composition tool application in accordance with some embodiments of the disclosed subject matter. FIG. 13A is a top plan view of composition device 1300 in accordance with some embodiments of the disclosed subject matter. FIGS. 13B-E are top, left side, right side, and bottom views, respectively, of composition device 1300 in accordance with some embodiments of the disclosed subject matter. Composition device 1300 and related methods of use may include any number of the following features, in any suitable combination. These features may be in any suitable location on the device 1300, or may be incorporated into the programming of the software of the device (e.g., volume control by touch with the touch screen). Composition device 1300 may include software compatibility to production software to take scores and replicate in production software as composed. Such software may include, for example, Logic, Reason, Serato Scratch Live, or any other suitable software. Composition device 1300 may include MIDI capabilities to import and export pieces. Composition device 1300 may be compatible with various computing devices (e.g., MAC, PC). Composition device 1300 may include printer capabilities to print scores in whole or in part as sheet music. Composition device 1300 may include a USB port to expand memory (e.g., flash drive) and link to a peripheral computing device. Composition device 1300 may include MP3 export to expand on basic score in production software and loop creation. Composition device 1300 may include memory chips and storage capabilities (e.g., at least an 8 GB internal drive and memory card plug-in). Composition device 1300 may include a rechargeable battery (e.g., with USB charging).

Composition device 1300 may include wireless or physical connections to a printer and USB ports to import/export files and print. Composition device 1300 may include a touch screen 1302 and, for example, a pop-up stylus pen 1304 from the top of the device. Composition device 1300 may include a slide out keypad (e.g., from left side of device). Composition device 1300 may include a virtual keyboard on touch screen 1302. Composition device 1300 may include a touch sensitive mouse pad for thumb/finger (e.g., at the bottom of the device). Composition device 1300 may include an on/off button (e.g., on front of device). Composition device 1300 may include a logo plate underneath the screen.

Figure 13D:
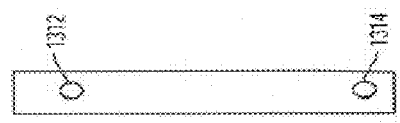
Figure 13C:
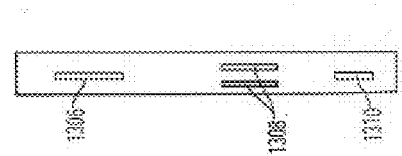
Figure 13E:

Composition device 1300 may include side ports as shown in FIGS. 13C and 13D including, for example, a volume control 1306, storage card ports 1308, an on/off lock guard for keys 1310, an earpiece plug-in 1312, and an AC outlet 1314. Composition device 1300 may include ports on the bottom of the device as shown in FIG. 13D including, for example, a USB port for flash drive/PC plug-in 1316.

In some embodiments, the dimensions of composition device 1300 may be, for example, around 3.25"×4.5" with the touch screen being around 3"×3.5", and having a thickness of around ¼" to ½". These dimensions are merely illustrative, and composition device 1300 may have any suitable dimensions.

Composition device 1300 may be used, for example, to receive and send email, to edit documents, or as a mobile telephone. Composition device 1300 may include, for example, GPS capabilities, Bluetooth connectivity (e.g., for a wireless headset), memory card expansion, Music ID song recognition, a keypad with backlighting, a high resolution touch screen (e.g., 240×320 pixels), Wi-Fi, any other suitable feature, or any suitable combination of features. Composition device 1300 may support digital media formats including, for example, AAC, AAC+, eAAC, MP3, WMA, WAV, MPEG4, AMR, any other suitable digital media format, or any suitable combination of formats. Composition device 1300 may allow a user to record video, audio, or voice.

It will be understood that the foregoing is only illustrative of the principles of the invention, and that various modifications can be made by those skilled in the art without departing from the scope and spirit of the invention.

What is claimed is:

1. A composition tool for creating a musical score, comprising:
   a memory capable of storing data; and
   a processor configured for using the data such that the composition tool can:
      provide to a user a score interface and a plurality of instrument interfaces, each instrument interface comprising a graphical representation of an instrument and a score section for illustration of at least one part of a musical score;
      provide to the user a touch screen interface to enable the user to select a portion of the graphical representation of one of the instruments by detecting the user's finger placements on the selected portion of the graphical representation of the instrument; and
      in response to the selection of the portion of the graphical representation of the instrument, provide a representation of at least one musical note that is corresponding to the selected portion of the graphical representation of the instrument in the score section,
      wherein the score interface is capable of displaying a score having at least one part and allowing a user to assign or deassign said part of the score to different instruments,
   wherein the plurality of instrument interfaces further includes a stringed instrument interface and wherein the stringed instrument interface includes a guitar interface that is capable of providing a tuning option to enable the user to retune each string in a guitar in the guitar interface to a specific note that is different from the default tuning.

2. The composition tool of claim 1, wherein the plurality of instrument interfaces includes a keyboard interface, a percussion interface and at least one of a mallet instrument interface, a brass instrument interface, a woodwinds instrument interface, an orchestral instrument interface, an Indian instrument interface, an Asian instrument interface and a Latin percussion instrument interface.

3. The composition tool of claim 2,
   wherein the mallet instrument includes a vibraphone, a glockenspiel, a xylophone and a marimba;
   wherein the Indian instrument includes a sitar and a harmonium;
   wherein the Asian instrument includes a gamelon, a koto and a taiko; and
   wherein the Latin percussion instrument includes a conga interface, a timbales interface, an agogo bells interface, and a tamborim interface.

4. The composition tool of claim 1, wherein the score interface is further capable of providing the user with a Chord option to enable the user to create a chord out of a selected note and an Arpeggio option to enable the user to playback a note that is scored as a chord as individual notes of the chord.

5. A composition tool for creating a musical score, comprising:
   a memory capable of storing data; and
   a processor configured for using the data such that the composition tool can:
      provide to a user a score interface and a plurality of instrument interfaces, each instrument interface comprising a graphical representation of an instrument and a score section for illustration of at least one part of a musical score;
      provide to the user a touch screen interface to enable the user to select a portion of the graphical representation of one of the instruments by detecting the user's finger placements on the selected portion of the graphical representation of the instrument; and
      in response to the selection of the portion of the graphical representation of the instrument, provide a representation of at least one musical note that is corresponding to the selected portion of the graphical representation of the instrument in the score section,
      wherein the score interface is capable of displaying a score having at least one part and allowing a user to assign or deassign said part of the score to different instruments,
      wherein the to the processor is further configured for using the data such that the composition too can further provide to the user a menu interface including a plurality of menu options, each menu option having at least one submenu option, wherein the menu interface is capable of providing a menu screen that can simultaneously show all of the plurality of menu options,
   wherein the to the processor is further configured for using the data such that the composition too can further provide to the user a menu interface including a plurality of menu options, each menu option having at least one submenu option, wherein the menu interface is capable of providing a menu screen that can simultaneously show all of the plurality of menu options,
   wherein the plurality of menu options includes an Insert menu option for enabling the user to add lyrics to a scored part, wherein the lyrics can be inserted based on note length to syllable ratios,
   wherein the lyrics added to a scored part includes one of a melody line designation for a lead vocal or a background designation for an accompanying part of the score,
   wherein the lyrics cause the note length to change to reflect a necessary increase in speed needed to deliver a vocal.

6. The composition tool of claim 5, wherein the menu screen includes a grid that is made of a plurality of menu boxes, each menu box for holding the each menu option and wherein the each menu box can expand to fill the screen or shrink back to the grid in response to a user input.

7. The composition tool of claim 6, wherein the plurality of menu options includes an Open-File menu option having an Open-Section submenu option for enabling the user to open a file containing a section and wherein the section includes a plurality of instrument parts across a span of time that does not comprise a full score on its own.

8. A composition tool for creating a musical score, comprising:
   a memory capable of storing data and
   a processor configured for using the data such that the composition tool can:
      provide to a user a score interface and a plurality of instrument interfaces, each instrument interface comprising a graphical representation of an instrument and a score section for illustration of at least one part of a musical score;
      provide to the user a touch screen interface to enable the user to select a portion of the graphical representation of one of the instruments by detecting the user's finger placements on the selected portion of the graphical representation of the instrument; and
      in response to the selection of the portion of the graphical representation of the instrument, provide a representation of at least one musical note that is corresponding to the selected portion of the graphical representation of the instrument in the score section, wherein the score interface is capable of displaying a score having at least one part and allowing a user to assign or deassign said part of the score to different instruments, wherein the to the processor is further configured for using the data such that the composition too can further provide to the user a menu interface including a plurality of menu options, each menu option having at least one submenu option, wherein the menu interface is capable of providing a menu screen that can simultaneously show all of the plurality of menu options, wherein the plurality of menu options includes a Lift-And-Insert menu option for enabling the user to lift a part from one place in a score and insert the lifted part in another place in the same score or in one place in a different score.

9. The composition tool of claim 8, wherein inserting the lifted part includes overlaying the lifted part at a point of overlay in the same or different score at full note value without reducing a length of an existing note at the point of overlay.

10. A method for creating a musical score, comprising:

providing for a user a score interface and a plurality of instrument interfaces, each instrument interface comprising a graphical representation of an instrument and a score section for illustration of at least one part of a musical score;

providing to the user a touch screen interface for enabling the user to select a portion of the graphical representation of one of the instruments by detecting the user's finger placements on the selected portion of the graphical representation of the instrument; and in response to the selection of the portion of the graphical representation of the instrument, providing a representation of at least one musical note that is corresponding to the selected portion of the graphical representation of the instrument in the score section, wherein providing the score interface to the user enables displaying for the user a score having at least one part and allowing the user to assign or deassign said part of the score to different instruments, wherein the plurality of instrument interfaces includes a stringed instrument interface and wherein providing the stringed instrument interface includes providing a guitar interface that is capable of providing a tuning option to enable the user to retune each string in a guitar in the guitar interface to a specific note that is different from the default tuning.

11. The method of claim 10, wherein providing the plurality of instrument interfaces includes providing a keyboard interface, a percussion interface and at least one of a mallet instrument interface, a brass instrument interface, a woodwinds instrument interface, an orchestral instrument interface, an Indian instrument interface, an Asian instrument interface and a Latin percussion instrument interface.

12. The method of claim 10, wherein the mallet instrument includes a vibraphone interface, a glockenspiel interface, a xylophone interface and a marimba interface;

wherein the Indian instrument includes a sitar interface and a harmonium interface;

wherein the Asian instrument includes a gamelon interface, a koto interface and a taiko interface; and wherein the Latin percussion instrument includes a conga interface, a timbales interface, an agogo bells interface, and a tamborim interface.

13. The method of claim 10, wherein providing the score interface to the user further enables providing the user with a Chord option to enable the user to create a chord out of a selected note and an Arpeggio option to enable the user to playback a note that is scored as a chord as individual notes of the chord.

14. The method of claim 10, further comprising providing to the user a menu interface including a plurality of menu options, wherein each menu option includes at least one submenu option and wherein the menu interface includes a menu screen that can simultaneously show all of the plurality of menu options.

15. A non-transitory computer-readable medium containing computer executable instructions that, when executed by a processor, cause the processor to perform a method for creating a musical score, the method comprising:

providing for a user a score interface and a plurality of instrument interfaces, each instrument interface comprising a graphical representation of an instrument and a score section for illustration of at least one part of a musical score;

providing to the user a touch screen interface for enabling the user to select a portion of the graphical representation of one of the instrument by detecting the user's finger placements on the selected portion of the graphical representation of the instrument; and in response to the selection of the portion of the graphical representation of the instrument, providing a representation of at least one musical note that is corresponding to the selected portion of the graphical representation of the instrument in the score section, wherein the score interface is capable of displaying a score having at least one part and allowing a user to assign or deassign said part of the score to different instruments, wherein the plurality of instrument interfaces includes a stringed instrument interface and wherein providing the stringed instrument interface includes providing a guitar interface that is capable of providing a tuning option to enable the user to retune each string in a guitar in the guitar interface to a specific note that is different from the default tuning.

* * * * *